United States Patent
Damnjanovic et al.

(10) Patent No.: US 8,693,383 B2
(45) Date of Patent: Apr. 8, 2014

(54) METHOD AND APPARATUS FOR HIGH RATE DATA TRANSMISSION IN WIRELESS COMMUNICATION

(75) Inventors: Aleksandar Damnjanovic, Del Mar, CA (US); Joseph P. Odenwalder, Rancho Santa Fe, CA (US); Stein Arne Lundby, Solana Beach, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 773 days.

(21) Appl. No.: 11/390,612

(22) Filed: Mar. 27, 2006

(65) Prior Publication Data
US 2006/0221883 A1 Oct. 5, 2006

Related U.S. Application Data

(60) Provisional application No. 60/666,461, filed on Mar. 29, 2005.

(51) Int. Cl.
*H04J 3/08* (2006.01)
(52) U.S. Cl.
USPC ........................................................ 370/315
(58) Field of Classification Search
USPC .............. 455/442, 452.2, 522, 101, 132, 434, 455/452.1; 370/206, 315, 331, 335, 328, 370/329, 33, 341, 252, 322, 330, 334, 344, 370/349, 437, 468, 490, 538, 540, 544; 714/748, 749, 750
See application file for complete search history.

(56) References Cited

U.S. PATENT DOCUMENTS

| | | | |
|---|---|---|---|
| 5,726,978 A | 3/1998 | Frodigh et al. | |
| 6,208,871 B1 * | 3/2001 | Hall et al. | 455/517 |
| 6,381,229 B1 * | 4/2002 | Narvinger et al. | 370/328 |

(Continued)

FOREIGN PATENT DOCUMENTS

| | | |
|---|---|---|
| CN | 1187930 | 7/1998 |
| JP | 2001516177 A | 9/2001 |

(Continued)

OTHER PUBLICATIONS

Liangchi Hsu et al. "Evolution Towards Simultaneous High-Speed Packet Data and Voice Services: An Overview of cdma2000 1xEV-DV," Telecommunications, 2003. ICT 2003, IEEE, Piscataway, NJ, USA. vol. 2, Feb. 23, 2003, pp. 1313-1317.

(Continued)

*Primary Examiner* — Kashif Siddiqui
(74) *Attorney, Agent, or Firm* — Stanton Braden

(57) ABSTRACT

Techniques for utilizing multiple carriers to substantially improve transmission capacity are described. For multi-carrier operation, a terminal receives an assignment of multiple forward link (FL) carriers and at least one reverse link (RL) carrier. The carriers may be arranged in at least one group, with each group including at least one FL carrier and one RL carrier. The terminal may receive packets on the FL carrier(s) in each group and may send acknowledgements for the received packets via the RL carrier in that group. The terminal may send channel quality indication (CQI) reports for the FL carrier(s) in each group via the RL carrier in that group. The terminal may also transmit data on the RL carrier(s). The terminal may send designated RL signaling (e.g., to originate a call) on a primary RL carrier and may receive designated FL signaling (e.g., for call setup) on a primary FL carrier.

21 Claims, 12 Drawing Sheets

(56) References Cited

U.S. PATENT DOCUMENTS

| | | | |
|---|---|---|---|
| 6,954,448 B2* | 10/2005 | Farley et al. | 370/337 |
| 7,149,190 B1* | 12/2006 | Li et al. | 370/278 |
| 7,403,470 B2* | 7/2008 | Lane et al. | 370/203 |
| 2002/0159422 A1 | 10/2002 | Li et al. | |
| 2003/0078010 A1* | 4/2003 | Davis | 455/69 |
| 2003/0129989 A1 | 7/2003 | Gholmieh et al. | |
| 2003/0137955 A1 | 7/2003 | Kim et al. | |
| 2003/0193915 A1 | 10/2003 | Lee et al. | |
| 2004/0001429 A1 | 1/2004 | Ma et al. | |
| 2004/0013103 A1* | 1/2004 | Zhang et al. | 370/345 |
| 2004/0017792 A1* | 1/2004 | Khaleghi et al. | 370/335 |
| 2004/0058687 A1* | 3/2004 | Kim et al. | 455/452.2 |
| 2004/0157635 A1* | 8/2004 | Park et al. | 455/522 |
| 2004/0196820 A1* | 10/2004 | Hsu et al. | 370/342 |
| 2004/0255220 A1 | 12/2004 | Sudo | |
| 2005/0078641 A1* | 4/2005 | Kim | 370/335 |
| 2005/0180515 A1 | 8/2005 | Orihashi et al. | |
| 2005/0195732 A1* | 9/2005 | Huh et al. | 370/206 |
| 2005/0207335 A1* | 9/2005 | Schmidl et al. | 370/206 |
| 2005/0245278 A1* | 11/2005 | Vannithamby et al. | 455/522 |
| 2006/0013182 A1* | 1/2006 | Balasubramanian et al. | 370/343 |
| 2006/0072508 A1* | 4/2006 | Zou et al. | 370/332 |
| 2006/0073834 A1* | 4/2006 | Thorson | 455/450 |
| 2006/0087998 A1 | 4/2006 | Saito et al. | |
| 2006/0153061 A1 | 7/2006 | Nishio | |

FOREIGN PATENT DOCUMENTS

| | | |
|---|---|---|
| JP | 2003249908 | 9/2003 |
| JP | 2004159302 A | 6/2004 |
| JP | 2004527166 | 9/2004 |
| JP | 2005027107 A | 1/2005 |
| RU | 2158479 C2 | 10/2000 |
| TW | 501375 | 9/2002 |
| TW | 508922 | 11/2002 |
| TW | 525358 | 3/2003 |
| TW | 536901 | 6/2003 |
| TW | 545000 | 8/2003 |
| TW | 548927 | 8/2003 |
| TW | 558875 | 10/2003 |
| TW | 560135 | 11/2003 |
| WO | WO9701256 A1 | 1/1997 |
| WO | 01/15481 A1 | 3/2001 |
| WO | WO03084108 | 10/2003 |
| WO | 2004/064294 A2 | 7/2004 |
| WO | 2004/114549 A1 | 12/2004 |
| WO | 2004114608 A1 | 12/2004 |
| WO | 2005/027397 A1 | 3/2005 |

OTHER PUBLICATIONS

Rao Yallapragada et al. "New Enhancements in 3G Technologies," Personal Wireless Communications, 2005, IEEE, Piscataway, NJ, USA. Jan. 23, 2005, pp. 182-187.

Douglas N Knisely et al. "cdma2000: A Third-Generation Radio Transmission Technology," Bell Labs Technical Journal, Wiley, CA, US. vol. 3, No. 3, Jul. 1, 1998, pp. 63-78.

Ericsson: "Downlink Control Signaling", 3GPP TSG-RAN WG1#38bis, R1-041177, Sep. 24, 2004.

International Search Report—PCT/US2006/011669—International Search Authority—European Patent Office—Dec. 8, 2006.

International Preliminary Report on Patentability—PCT/US2006/011669, International Search Authority—The International Bureau of WIPO, Geneva, Switzerland—Oct. 3, 2007.

Written Opinion—PCT/US2006/011669—International Search Authority—European Patent Office—Dec. 8, 2006.

3GPP2 C.S0002-D v.1.0, Physical Layer Standard for cdma2000 Spread Spectrum Systems, (Revision D), Feb. 13, 2004.

3GPP2 C.S0003-D v. 1.0 "Medium Access Control (MAC) Standard for cdma2000 Spread Spectrum Systems," (Release D), Feb. 13, 2004.

* cited by examiner

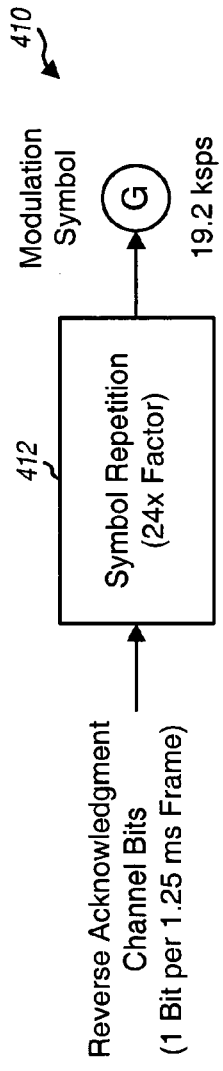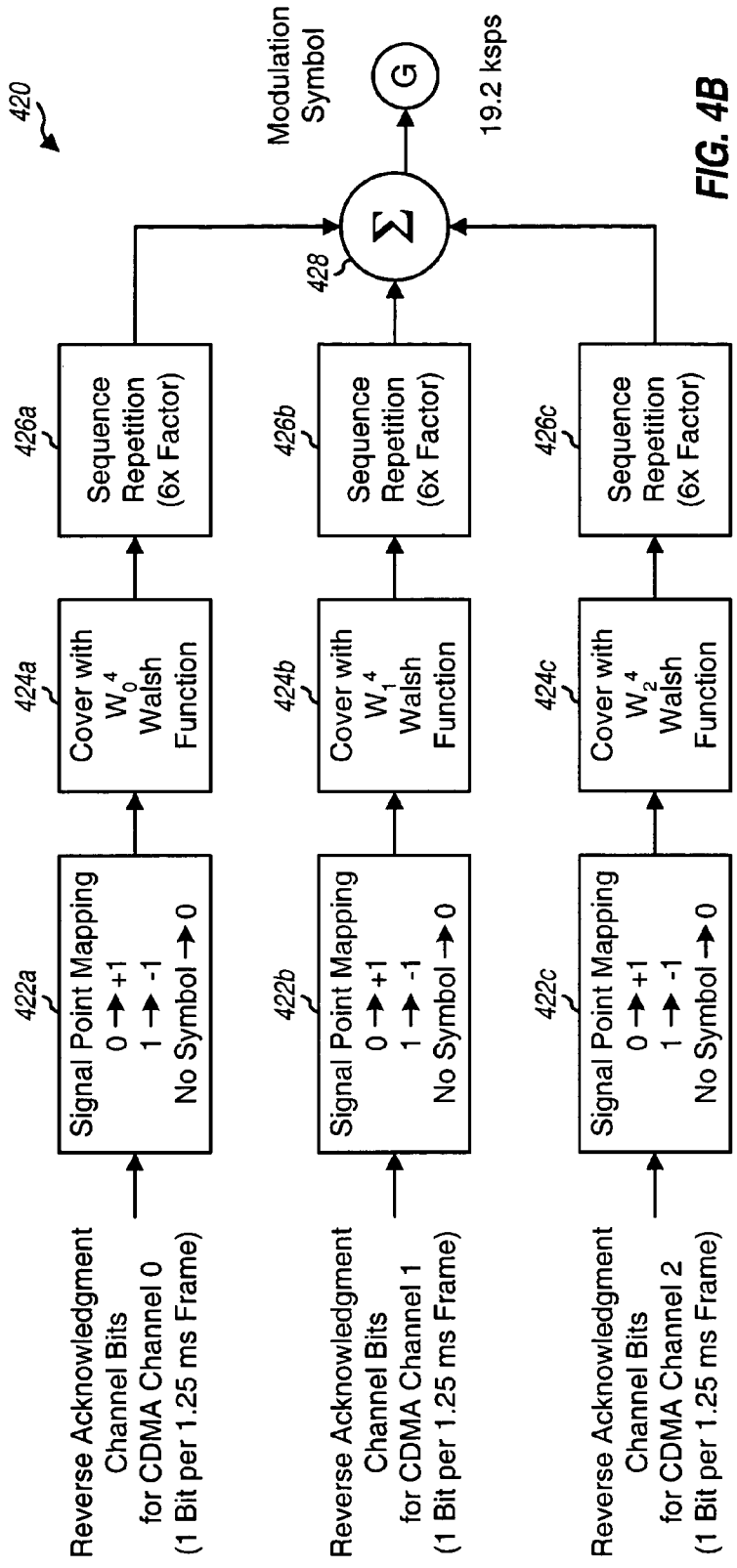

METHOD AND APPARATUS FOR HIGH RATE DATA TRANSMISSION IN WIRELESS COMMUNICATION

CLAIM OF PRIORITY UNDER 35 U.S.C. §119

The present application for patent claims priority to Provisional Application Ser. No. 60/666,461, entitled "METHOD AND APPARATUS FOR HIGH RATE DATA TRANSMISSION IN WIRELESS COMMUNICATIONS," filed Mar. 29, 2005, assigned to the assignee hereof, and expressly incorporated herein by reference.

BACKGROUND

I. Field

The present disclosure relates generally to communication, and more specifically to techniques for high rate data transmission.

II. Background

Wireless communication systems are widely deployed to provide various communication services such as voice, packet data, broadcast, messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Data usage for wireless communication systems continually grows due to increasing number of users as well as emergence of new applications with higher data requirements. However, a given system typically has limited transmission capacity, which is determined by the design of the system. A substantial increase in transmission capacity is often realized by deploying a new generation or a new design of a system. For example, the transition from second generation (2G) to third generation (3G) in cellular systems provides substantial improvements in data rate and features. However, new system deployment is capital intensive and often complicated.

There is therefore a need in the art for techniques to improve transmission capacity of a wireless communication system in an efficient and cost effective manner.

SUMMARY

Techniques for utilizing multiple carriers on the forward and/or reverse link to significantly improve transmission capacity are described herein. These techniques may be used for various wireless communication systems such as, e.g., a cdma2000 system. These techniques may provide various benefits with relatively minor changes to existing channel structures designed for single-carrier operation.

According to an embodiment of the invention, an apparatus is described which includes at least one processor and a memory. The processor(s) receive an assignment of multiple forward link (FL) carriers and at least one reverse link (RL) carrier. The processor(s) thereafter receive data transmission on one or more of the multiple FL carriers.

According to another embodiment, a method is provided in which an assignment of multiple FL carriers and at least one RL carrier is received. Data transmission is thereafter received on one or more of the multiple FL carriers.

According to yet another embodiment, an apparatus is described which includes means for receiving an assignment of multiple FL carriers and at least one RL carrier, and means for receiving data transmission on one or more of the multiple FL carriers.

According to yet another embodiment, an apparatus is described which includes at least one processor and a memory. The processor(s) obtain acknowledgements for packets received on multiple data channels (e.g., F-PDCHs), channelize the acknowledgement for each data channel with an orthogonal code assigned to the data channel to generate a symbol sequence for the data channel, and generate modulation symbols for an acknowledgement channel (e.g., R-ACKCH) based on the symbol sequences for the multiple data channels.

According to yet another embodiment, a method is provided in which acknowledgements are obtained for packets received on multiple data channels. The acknowledgement for each data channel is channelized with an orthogonal code assigned to the data channel to generate a symbol sequence for the data channel. Modulation symbols for an acknowledgement channel are generated based on the symbol sequences for the multiple data channels.

According to yet another embodiment, an apparatus is described which includes means for obtaining acknowledgements for packets received on multiple data channels, means for channelizing the acknowledgement for each data channel with an orthogonal code assigned to the data channel to generate a symbol sequence for the data channel, and means for generating modulation symbols for an acknowledgement channel based on the symbol sequences for the multiple data channels.

According to yet another embodiment, an apparatus is described which includes at least one processor and a memory. The processor(s) obtain full channel quality indication (CQI) reports for multiple FL carriers, with each full CQI report indicative of received signal quality for one FL carrier. The processor(s) send the full CQI reports for the multiple FL carriers in different time intervals on a CQI channel (e.g., R-CQICH).

According to yet another embodiment, a method is provided in which full CQI reports for multiple FL carriers are obtained, with each full CQI report indicative of received signal quality for one FL carrier. The full CQI reports for the multiple FL carriers are sent in different time intervals on a CQI channel.

According to yet another embodiment, an apparatus is described which includes means for obtaining full CQI reports for multiple FL carriers, with each full CQI report indicative of received signal quality for one FL carrier, and means for sending the full CQI reports for the multiple FL carriers in different time intervals on a CQI channel.

According to yet another embodiment, an apparatus is described which includes at least one processor and a memory. The processor(s) operate in a control-hold mode that allows for transmission of a gate pilot, receive a data channel (e.g., P-PDCH) sent on the forward link while in the control-hold mode, transmit a gated pilot on a reverse link if no other transmissions are being sent on the reverse link, and transmit a full pilot on the reverse link if a transmission is being sent on the reverse link.

According to yet another embodiment, a method is provided in which a terminal is operated in a control-hold mode that allows for transmission of a gate pilot. A data channel sent on a forward link is received while in the control-hold mode. A gated pilot is transmitted on the reverse link if no other transmissions are being sent on the reverse link. A full pilot is transmitted on the reverse link if a transmission is being sent on the reverse link.

According to yet another embodiment, an apparatus is described which includes means for operating in a control-hold mode that allows for transmission of a gated pilot, means for receiving a data channel sent on the forward link while in the control-hold mode, means for transmitting a gated pilot on the reverse link if no other transmissions are being sent on the reverse link, and means for transmitting a full pilot on the reverse link if a transmission is being sent on the reverse link.

Various aspects and embodiments of the invention are described in further detail below.

BRIEF DESCRIPTION OF THE DRAWINGS

FIG. 4A shows an R-ACKCH structure in cdma2000 revision D.

FIGS. 4B and 4C show a new R-ACKCH structure that can support up to three and seven R-ACKCHs, respectively, for multiple FL carriers.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
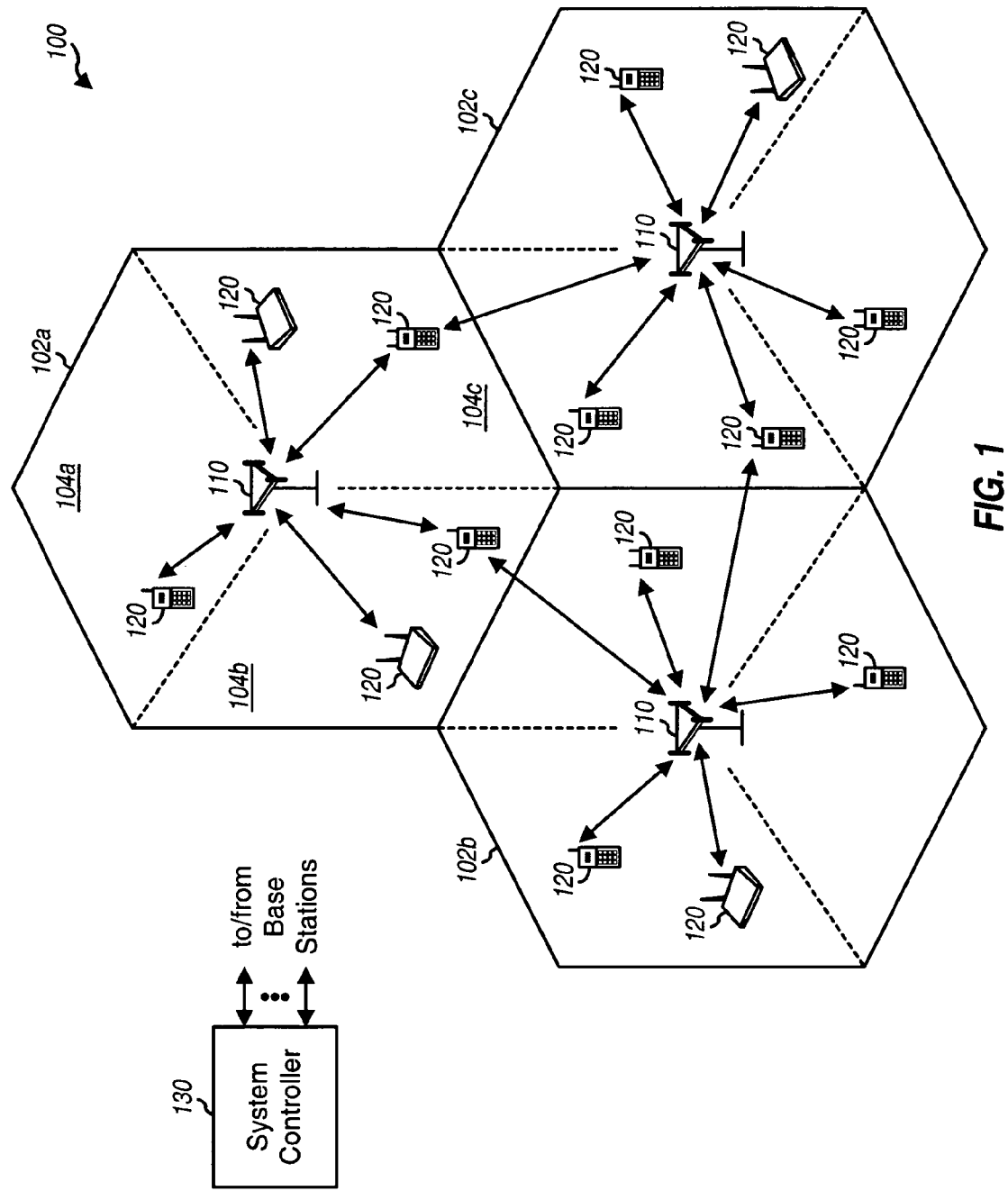
FIG. 1 shows a wireless communication system.

FIG. 1 shows a wireless communication system 100 with multiple base stations 110 and multiple terminals 120. A base station is generally a fixed station that communicates with the terminals and may also be referred to as an access point, a Node B, a base transceiver subsystem (BTS), and/or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. The term "sector" can refer to a fixed station that serves a smaller area and/or its coverage area depending on the context in which the term is used. For a sectorized cell, a base station typically serves all sectors of the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be referred to as a mobile station, a user equipment, or some other terminology. A terminal may be a cellular phone, a personal digital assistant (PDA), a wireless device, a handheld device, a wireless modem, and so on. A terminal may communicate with zero, one, or multiple base stations on the forward and/or reverse link at any given moment. The forward link (or downlink) refers to the communication link from the base stations to the terminals, and the reverse link (or uplink) refers to the communication link from the terminals to the base stations.

A system controller 130 couples to base stations 110 and provides coordination and control for these base stations. System controller 130 may be a single network entity or a collection of network entities.

The transmission techniques described herein may be used for various wireless communication systems such as CDMA, TDMA, FDMA and OFDMA systems. A CDMA system may implement one or more radio technologies such as cdma2000, Wideband-CDMA (W-CDMA), and so on. cdma2000 covers IS-2000, IS-856, IS-95, and other standards. A TDMA system may implement a radio technology such as Global System for Mobile Communications (GSM). These various radio technologies and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, the transmission techniques are specifically described below for a cdma2000 system, which may be a "CDMA 1x-EVDV", "CDMA 1x", "CDMA 1x-EVDO" and/or "1x" system.

cdma2000 defines various data and control channels that support data transmission on the forward and reverse links. Table 1 lists some data and control channels for the forward and reverse links and provides a short description for each channel. In the description herein, prefix "F-" denotes a channel for the forward link and prefix "R-" denotes a channel for the reverse link. The channels are described in detail in "TIA/EIA IS-2000.2 Physical Layer Standard for cdma2000 Spread Spectrum Systems, Release D" (hereinafter, TIA/EIA IS-2000.2) and "TIA/EIA IS-2000.3 Medium Access Control (MAC) Standard for cdma2000 Spread Spectrum Systems, Release D" (hereinafter, TIA/EIA IS-2000.3), both from Telecommunications Industry Association, dated 2004, and publicly available. cdma2000 revision D is also referred to as IS-2000 revision D, or simply "Rev D". The data and control channels are also described in other standard documents for cdma2000.

TABLE 1

| Link | Channel | Description |
| --- | --- | --- |
| Forward Link | F-PDCH | Forward Packet Data Channel - used to send packet data to specific terminals in a time division multiplexed (TDM) manner. |
| | F-PDCCH | Forward Packet Data Control Channel - carries control data for an associated F-PDCH. |
| | F-ACKCH | Forward Acknowledgement Channel - carries feedback for transmissions received on the R-PDCH. |
| | F-GCH | Forward Grant Channel - used by a base station to grant a terminal permission to transmit on the R-PDCH. |

TABLE 1-continued

| Link | Channel | Description |
|---|---|---|
| Reverse Link | R-PDCH | Reverse Packet Data Channel - used to send packet data to a base station. |
| | R-ACKCH | Reverse Acknowledgement Channel - carries feedback for transmissions received on the F-PDCH. |
| | R-CQICH | Reverse Channel Quality Indication Channel - carries channel quality measurements for the forward link. |
| | R-PICH | Reverse Pilot Channel - carries a pilot on the reverse link. |
| | R-REQCH | Reverse Request Channel - used by a terminal to request a higher data rate for the R-PDCH. |

In general, the F-PDCH, F-PDCCH, R-ACKCH and R-CQICH are used for data transmission on the forward link. The R-PDCH, R-REQCH, R-PICH, F-ACKCH and F-GCH are used for data transmission on the reverse link. In general, each channel may carry control information, data, pilot, other transmission, or any combination thereof.

Figure 2:
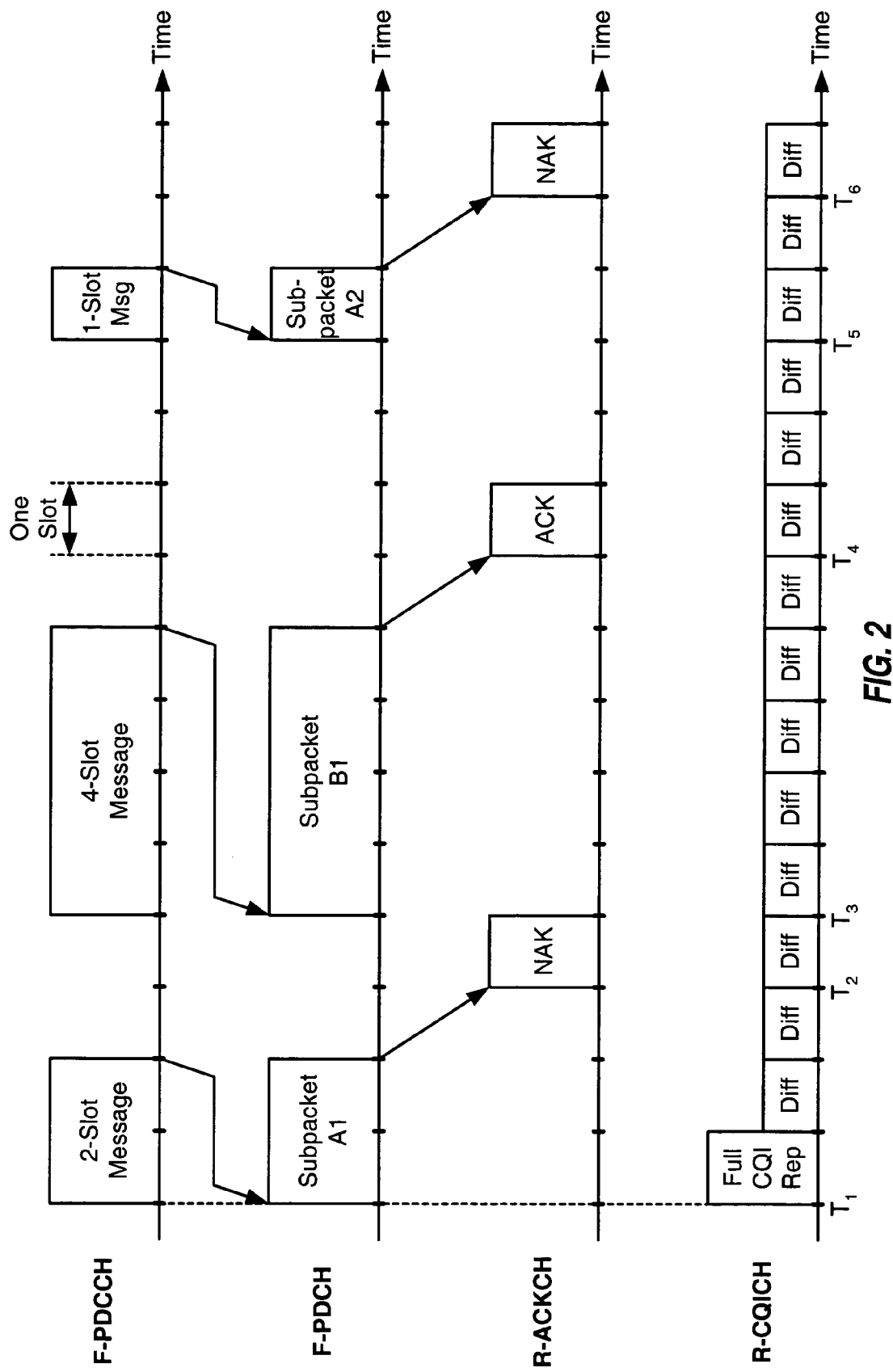
FIG. 2 shows an exemplary data transmission on the forward link in cdma2000.

FIG. 2 shows an exemplary data transmission on the forward link in cdma2000. A base station has data packets to send to a terminal. The base station processes each data packet to generate a coded packet and further partitions the coded packet into multiple subpackets. Each subpacket contains sufficient information to allow the terminal to decode and recover the packet under favorable channel conditions.

The base station transmits the first subpacket A1 for packet A on the F-PDCH in two slots starting at time $T_1$. A slot has a duration of 1.25 milliseconds (ms) in cdma2000. The base station also transmits on the F-PDCCH a 2-slot message that indicates that the transmission on the F-PDCH is for the terminal. The terminal receives and decodes subpacket A1, determines that packet A is decoded in error, and sends a negative acknowledgement (NAK) on the R-ACKCH at time $T_2$. In this example, the ACK delay is 1 slot. The base station transmits the first subpacket B1 for packet B on the F-PDCH in four slots starting at time $T_3$. The base station also transmits on the F-PDCCH a 4-slot message that indicates that the transmission on the F-PDCH is for the terminal. The terminal receives and decodes subpacket B1, determines that packet B is decoded correctly, and sends an acknowledgement (ACK) on the R-ACKCH at time $T_4$. The base station transmits the second subpacket A2 for packet A on the F-PDCH in one slot starting at time $T_5$. The terminal receives subpacket A2, decodes subpackets A1 and A2, determines that packet A is decoded in error, and sends a NAK on the R-ACKCH at time $T_6$.

The terminal also periodically measures the channel quality for base stations that can potentially transmit data to the terminal. The terminal identifies the best base station and sends full and differential (Diff) channel quality indication (CQI) reports on the R-CQICH, as described below. The CQI reports are used to select the most suitable base station to send data to the terminal as well as a suitable data rate for data transmission.

In cdma2000, a base station spectrally spreads data with a pseudo-random number (PN) sequence at a rate of 1.2288 megachips/second (Mcps). The base station modulates a carrier signal with the spread data and generates a radio frequency (RF) modulated signal having a bandwidth of 1.2288 MHz. The base station then transmits the RF modulated signal at a specific center frequency on the forward link. This is referred to as single-carrier CDMA since a single carrier is modulated with data. The capacity of the forward link is determined by the number of data bits that may be reliably sent in the 1.2288 MHz RF modulated signal. On the reverse link, a terminal also spectrally spreads data with a PN sequence at 1.2288 Mcps and transmits the spread data at a specific carrier frequency. The capacity of the reverse link is determined by the number of data bits that may be reliably sent on a data channel assigned to the terminal.

In an aspect, multiple carriers are utilized on a link to achieve significant capacity improvement on that link. In an embodiment, a chip rate of 1.2288 Mcps is used for each of the multiple carriers, which is the same chip rate used for single-carrier CDMA. This allows hardware designed for single-carrier CDMA to also support multi-carrier CDMA.

Figure 3:
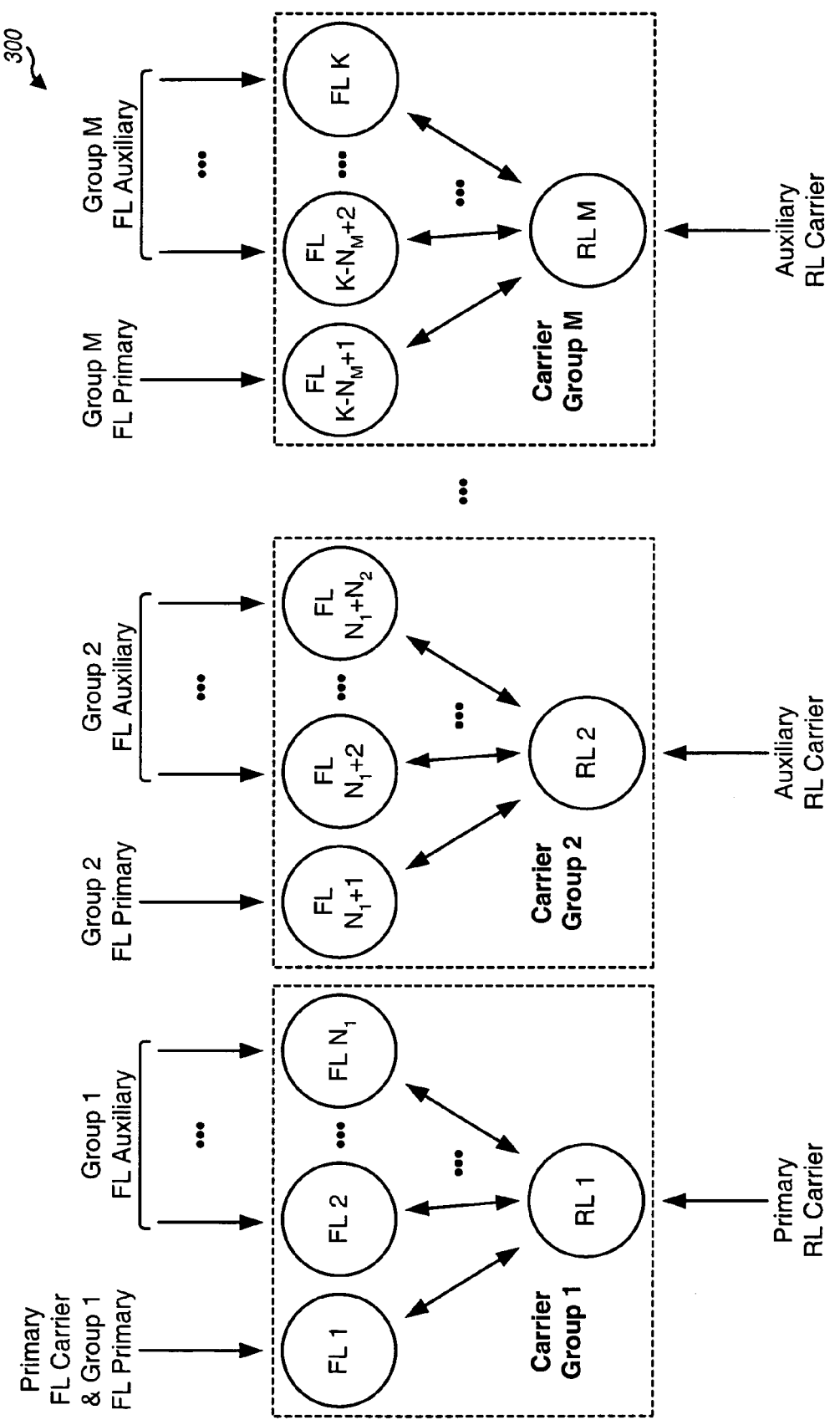
FIG. 3 shows an exemplary multi-carrier structure.

FIG. 3 shows a diagram of an embodiment of a multi-carrier structure 300. In this embodiment, K carriers are available on the forward link, and M carriers are available on the reverse link, where K>1 and M≥1. A forward link (FL) carrier is a carrier on the forward link, and a reverse link (RL) carrier is a carrier on the reverse link. A carrier may also be referred to as an RF channel, a CDMA channel, and so on. The K FL carriers and M RL carriers are arranged in G groups, where G≥1. In general, any number of carrier groups may be formed, and each group may include any number of FL carriers and any number of RL carriers.

In the embodiment shown in FIG. 3, each carrier group includes at least one FL carrier and one RL carrier, so that G=M and K≥M. As shown in FIG. 3, carrier group 1 includes FL carriers 1 through $N_1$ and RL carrier 1, carrier group 2 includes FL carriers $N_1+1$ through $N_1+N_2$ and RL carrier 2, and so on, and carrier group M includes FL carriers $K-N_M+1$ through K and RL carrier M. In general, $N_1$ through $N_M$ may be the same or different. In an embodiment, $N_m \leq 4$, for m=1, . . . , M, and up to four FL carriers may be associated with a single RL carrier in each carrier group.

Multi-carrier structure 300 supports various system configurations. A configuration with multiple FL carriers and multiple RL carriers may be used for high rate data transmission on both the forward and reverse links. A configuration with multiple FL carriers and a single RL carrier may be used for high rate data transmission on the forward link. A configuration with a single FL carrier and multiple RL carriers may be used for high rate data transmission on the reverse link. A suitable configuration may be selected for a terminal based on various factors such as the available system resources, data requirements, channel conditions, and so on.

In an embodiment, the FL and RL carriers have different significance. For each group, one (e.g., the first) FL carrier in the group is designated as a group FL primary, and each remaining FL carrier (if any) in the group is designated as a group FL auxiliary. One (e.g., the first) FL carrier among the K FL carriers is designated as a primary FL carrier. Similarly, one (e.g., the first) RL carrier among the M RL carriers is designated as a primary RL carrier.

A terminal may be assigned any number of FL carriers, one of which is designated as the primary FL carrier for that terminal. A terminal may also be assigned any number of RL carriers, one of which is designated as the primary RL carrier for that terminal. Different terminals may be assigned different sets of FL and RL carriers. Furthermore, a given terminal may be assigned different sets of FL and RL carriers over time based on various factors such as those noted above.

In an embodiment, a terminal uses the primary FL and RL carriers for the following functions:

Originate a call on the primary RL carrier,
Receive signaling during call setup on the primary FL carrier,
Perform Layer 3 signaling handoff procedure on the primary FL carrier, and Select a serving base station for FL transmission based on the primary FL carrier.

In an embodiment, the group FL primary in each carrier group controls the RL carrier in that group. The group FL primary may be used for the following functions:

Send power control for the R-PICH,

Send rate control for the R-PDCH,

Send acknowledgements (on the F-ACKCH) for reverse link transmissions,

Send MAC control messages (on the F-PDCCH) to the terminal, and

Send forward grant messages (on the F-GCH) to the terminal.

The data and control channels in cdma2000 revision D are designed for data transmission on a single carrier. Some of the control channels may be modified to support data transmission on multiple carriers. The modifications may be such that (1) the modified control channels are backward compatible with the control channels in cdma2000 revision D and (2) the new changes may be easily implemented, e.g., in software and/or firmware, which may reduce impact on hardware design.

A base station may transmit data on the forward link on any number of FL carriers in any number of carrier groups to a terminal. In an embodiment, the RL carrier in each group carries the R-ACKCH and R-CQICH that support all of the FL carriers in that group. In this embodiment, the R-ACKCH carries acknowledgements for packets received on the F-PDCHs for all FL carriers in the group. The R-CQICH provides CQI feedback for all FL carriers in the group.

1. R-ACKCH

In another aspect, a new R-ACKCH structure that can support data transmission on multiple FL carriers is described. A terminal may be monitoring multiple FL carriers in a given group while transmitting on a single RL carrier, as shown in FIG. 3. The terminal may receive multiple packets on multiple F-PDCHs sent on these multiple FL carriers. The terminal may acknowledge these multiple packets via a single R-ACKCH sent on the single RL carrier. The R-ACKCH may be designed with the capability to carry acknowledgments for one or multiple packets, depending on the number of FL carriers being received.

FIG. 4A shows a block diagram of an R-ACKCH structure 410 used in cdma2000 revision D. An R-ACKCH bit is generated in each 1.25 ms frame, which is one slot. This R-ACKCH bit may be (1) an ACK if a packet is decoded correctly, (2) a NAK if a packet is decoded in error, or (3) a null bit if there is no packet to acknowledge. The R-ACKCH bit is repeated 24 times by a symbol repetition unit 412 to generate 24 identical modulation symbols, which are further processed and transmitted on the R-ACKCH.

FIG. 4B shows a block diagram of an embodiment of a new R-ACKCH structure 420 that can support up to four R-ACKCHs for up to four FL carriers. The four R-ACKCHs may also be considered as four sub-channels of a single R-ACKCH and may be called Reverse Acknowledgement Sub-Channels (R-ACKSCHs). In the following description, the acknowledgement channel for each FL carrier is referred to as an R-ACKCH instead of an R-ACKSCH.

FIG. 4B shows a case in which three R-ACKCHs are used for three FL carriers, which are referred to as CDMA channels 0, 1 and 2. The R-ACKCH for each CDMA channel is implemented with a respective set of signal point mapping unit 422, Walsh cover unit 424, and repetition unit 426. CDMA channels 0, 1 and 2 are assigned 4-chip Walsh codes of $W_0^4$, $W_1^4$ and $W_2^4$, respectively. The Walsh codes are also referred to as Walsh functions or Walsh sequences and are defined in TIA/EIA IS-2000.2.

An R-ACKCH bit is generated in each 1.25 ms frame (or slot) for each CDMA channel. For CDMA channel 0, signal point mapping unit 422a maps the R-ACKCH bit for CDMA channel 0 to a value of +1, −1, or 0 depending on whether the R-ACKCH bit is an ACK, a NAK, or a null bit, respectively. Walsh cover unit 424a covers the mapped value with the 4-chip Walsh code $W_0^4$ assigned to CDMA channel 0. The Walsh covering is achieved by (1) repeating the mapped value four times and (2) multiplying the four identical values with the four chips of Walsh code $W_0^4$ to generate a sequence of four symbols. Repetition unit 426a repeats the 4-symbol sequence six times and generates a sequence of 24 symbols for CDMA channel 0. The processing for CDMA channels 1 and 2 proceeds in similar manner as CDMA channel 0.

In each slot, a summer 428 sums the three 24-symbol sequences from repetition units 426a, 426b and 426c for CDMA channels 0, 1 and 2, respectively, and provides 24 modulation symbols for the slot. These modulation symbols are further processed and transmitted. A base station is able to recover the R-ACKCH bit for each CDMA channel by performing the complementary decovering with the Walsh code assigned to that CDMA channel.

Figure 4C:
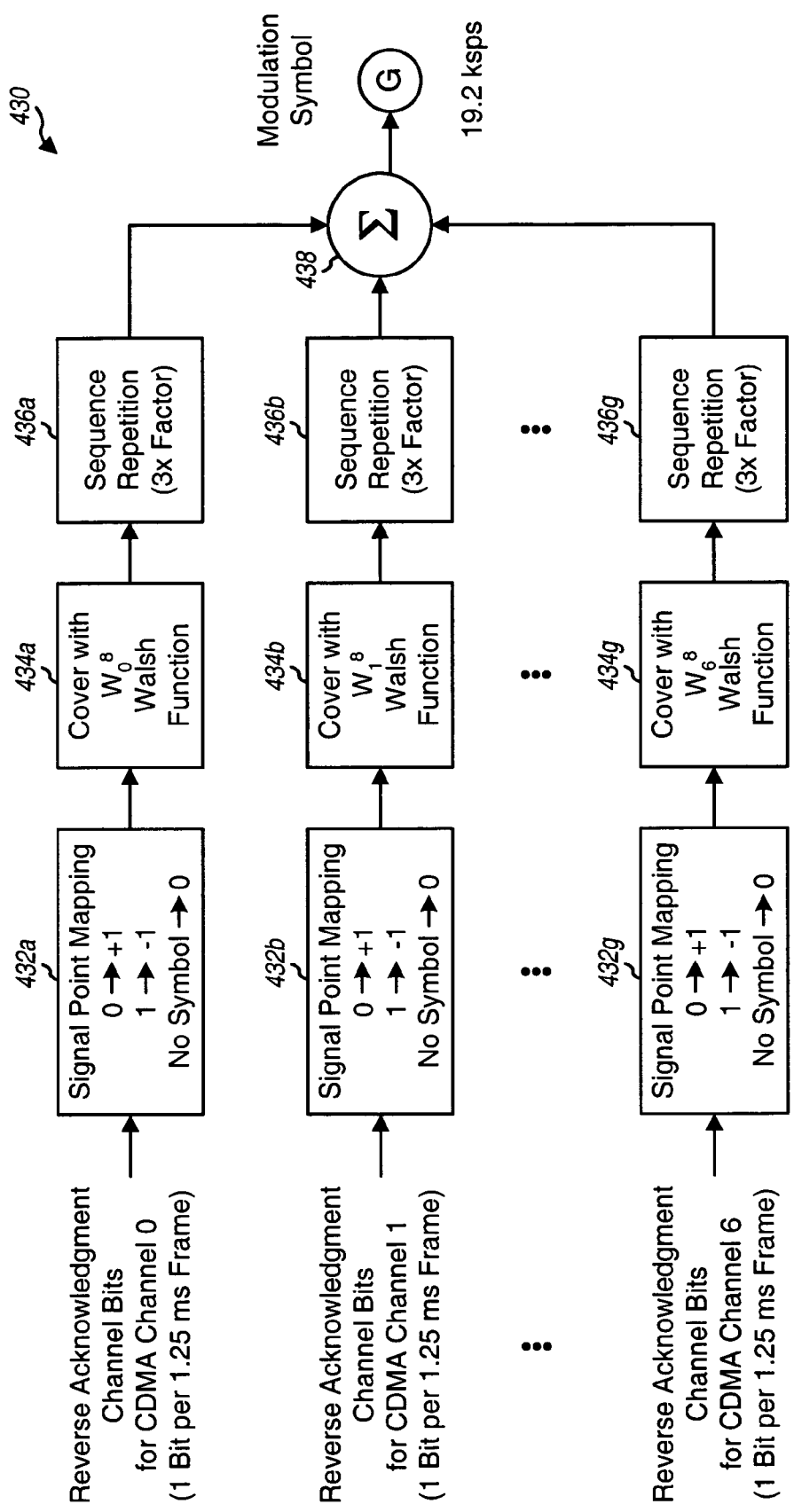

FIG. 4C shows a block diagram of an embodiment of a new R-ACKCH structure 430 that can support up to eight R-ACKCHs, e.g., for up to eight FL carriers. FIG. 4C shows a case in which seven R-ACKCHs are used for seven FL carriers, which are referred to as CDMA channels 0 through 6. The R-ACKCH for each CDMA channel is implemented with a respective set of signal point mapping unit 432, Walsh cover unit 434, and repetition unit 436. CDMA channels 0 through 6 are assigned 8-chip Walsh codes of $W_0^8$ through $W_6^8$, respectively, which are defined in TIA/EIA IS-2000.2.

For each CDMA channel, signal point mapping unit 432 maps the R-ACKCH bit for that CDMA channel to a value of +1, −1, or 0. Walsh cover unit 434 covers the mapped value with the 8-chip Walsh code assigned to that CDMA channel and provides a sequence of eight symbols. Repetition unit 436 repeats the 8-symbol sequence three times and generates a sequence of 24 symbols for the CDMA channel. In each slot, a summer 438 sums the seven 24-symbol sequences from repetition units 436a through 436g for CDMA channels 0 through 6, respectively, and provides 24 modulation symbols for the slot. These modulation symbols are further processed and transmitted.

FIGS. 4B and 4C show exemplary R-ACKCH structures 420 and 430 that support multiple R-ACKCHs and are backward compatible with the current R-ACKCH structure 410 shown in FIG. 4A. If only one CDMA channel is being received, then the R-ACKCH bits for this CDMA channel may be processed with Walsh code $W_0^4$ or $W_0^8$, and the R-ACKCH bits for all other CDMA channels may be set to null bits. The output of summer 428 or 438 would then be identical to the output of repetition unit 412 in FIG. 4A. Additional CDMA channels may be supported by sending the R-ACKCH bits for these additional CDMA channels using other Walsh codes. The repetition factor is reduced from 24 down to either 6 or 3 depending on the Walsh code length.

The R-ACKCH structures shown in FIGS. 4B and 4C allow for recovery of the R-ACKCH bits using hardware designed for the R-ACKCH structure shown in FIG. 4A. The hardware may generate 24 received symbols for the R-ACKCHs in each slot. The decovering of these 24 received symbols with Walsh codes may be performed in software and/or firmware, which may reduce the impact of upgrading a base station to support multi-carrier operation.

Multiple R-ACKCHs may also be implemented with other structures, and this is within the scope of the present invention. For example, multiple R-ACKCHs may be time division multiplexed and sent in different intervals of a given slot.

2. R-CQICH

In yet another aspect, a new R-CQICH structure that can support CQI feedback for multiple FL carriers is described. A terminal may be monitoring multiple FL carriers in a given group while transmitting on a single RL carrier, as shown in FIG. 3. These multiple FL carriers may observe different channel conditions (e.g., different fading characteristics) and may achieve different received signal qualities at the terminal. It is desirable for the terminal to provide CQI feedback for as many of the assigned FL carriers as possible so that the system can select the proper FL carrier(s) to send data as well as a suitable rate for each selected FL carrier. If the system configuration includes a single RL carrier, then the terminal may send CQI feedback for all FL carriers on a single R-CQICH via the single RL carrier. The R-CQICH may be designed with the capability to carry CQI feedback for one or multiple FL carriers.

In cdma2000 revision D, the R-CQICH may operate in one of two modes, a full mode or a differential mode, in each 1.25 ms frame (or slot). In the full mode, a full CQI report composed of a 4-bit value is sent on the R-CQICH. This 4-bit CQI value conveys the received signal quality for one CDMA channel. In the differential mode, a differential CQI report composed of a 1-bit value is sent on the R-CQICH. This 1-bit CQI value conveys the difference in received signal quality between the current and prior slots for one CDMA channel. The full and differential CQI reports may be generated as described in TIA/EIA IS-2000.2.

Figure 5A:
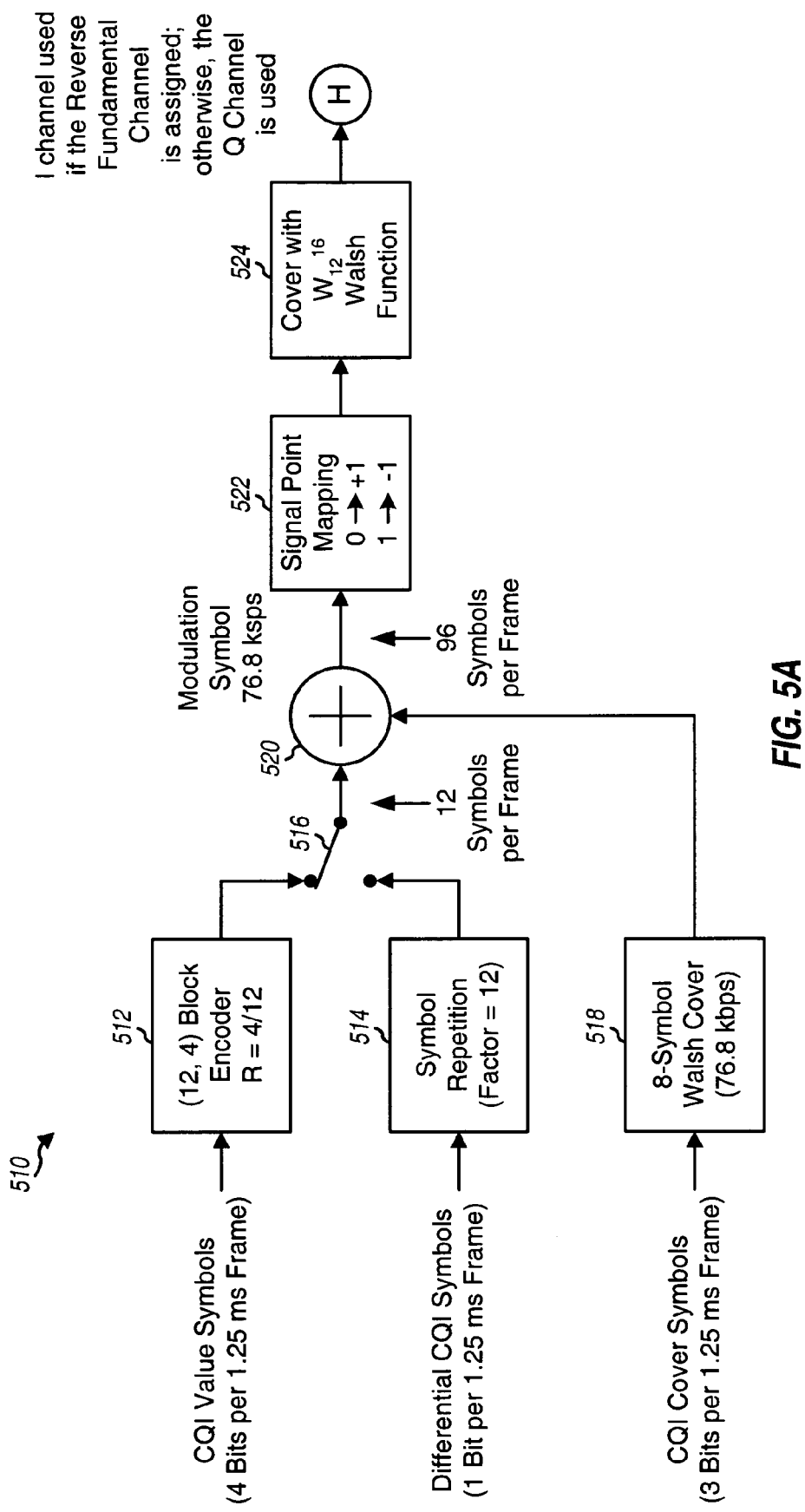
FIG. 5A shows an R-CQICH structure in cdma2000 revision D.

FIG. 5A shows a block diagram of an R-CQICH structure 510 used in cdma2000 revision D. A 4-bit or 1-bit CQI value may be generated in each 1.25 ms frame (or slot) for a CDMA channel, depending on whether the full or differential mode is selected. A 4-bit CQI value is also referred to as a CQI value symbol. A 1-bit CQI value is also referred to as a differential CQI symbol. A 4-bit CQI value is encoded with a (12, 4) block code by a block encoder 512 to generate a codeword with 12 symbols. A 1-bit CQI value is repeated 12 times by a symbol repetition unit 514 to generate 12 symbols. A switch 516 selects either the output of block encoder 512 for the full mode or the output of repetition unit 514 for the differential mode.

A CQI report may be sent to a specific base station by covering the report with a Walsh code assigned to that base station. A Walsh cover unit 518 receives a 3-bit Walsh code for a base station selected to serve the terminal and generates a corresponding 8-chip Walsh sequence. Unit 518 also repeats the 8-chip Walsh sequence 12 times and provides 96 Walsh chips in each slot. A modulo-2 adder 520 adds the symbols from switch 516 with the output of Walsh cover unit 518 and provides 96 modulation symbols in each slot. Walsh cover unit 518 and adder 520 effectively cover each symbol from switch 516 with the 3-bit Walsh code for the selected base station. A signal point mapping unit 522 maps each modulation symbol to a value of +1 or −1. A Walsh cover unit 524 covers each mapped value from unit 522 with a Walsh code of $W_{12}^{16}$ and provides output symbols, which are further processed and transmitted on the R-CQICH.

The new R-CQICH structure can support the full and differential modes for one or multiple FL carriers. In an embodiment, full CQI reports for different FL carriers in a group are sent in different slots in a TDM manner. In an embodiment, differential CQI reports for all FL carriers in the group for a given slot are jointly encoded and sent together in the slot. The joint encoding of differential CQI reports is more efficient than separate encoding of individual differential CQI reports. The repetition in block 514 is replaced by more efficient coding.

Figure 5B:
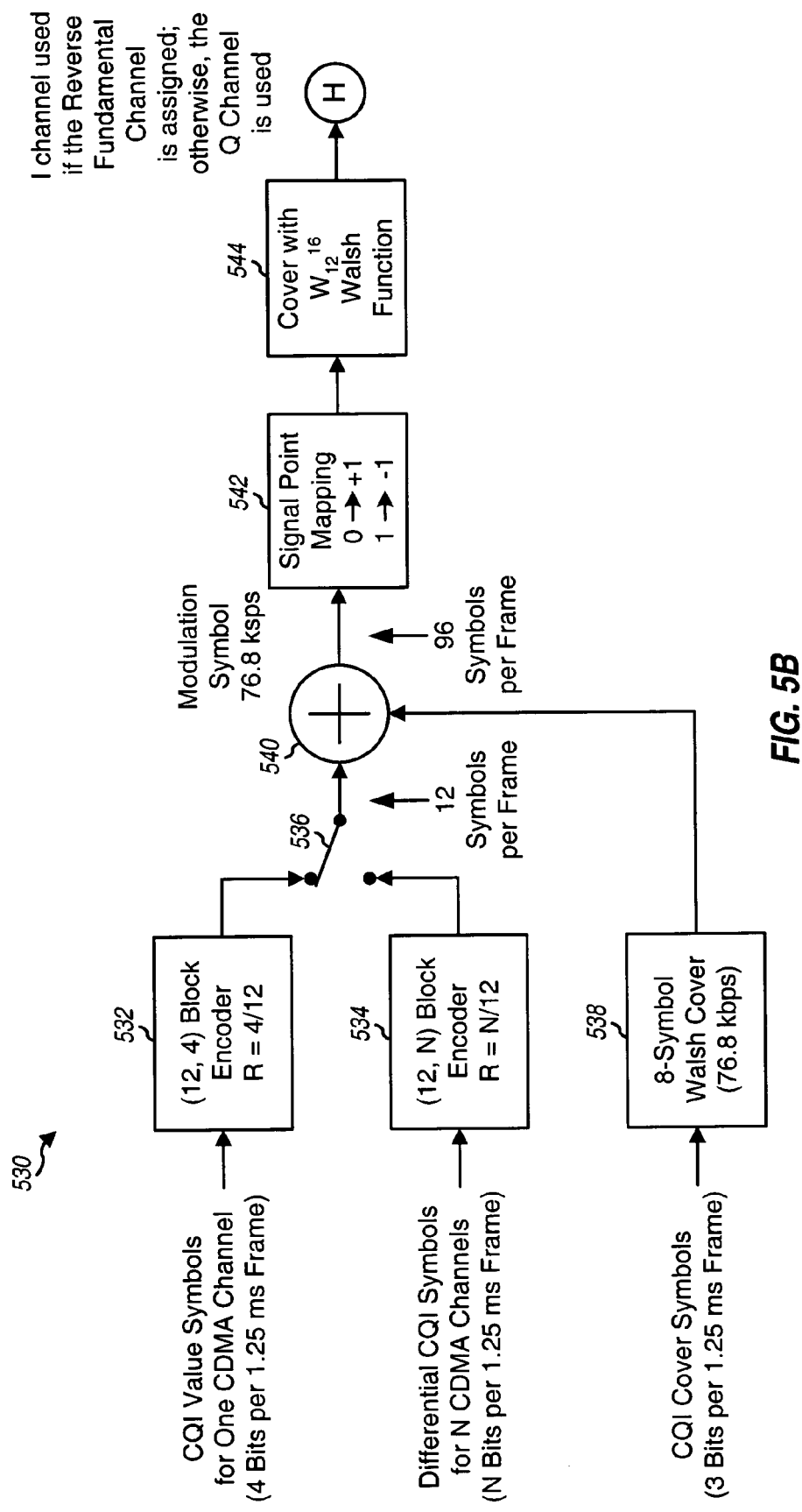
FIG. 5B shows a new R-CQICH structure that can support multiple FL carriers.

FIG. 5B shows a block diagram of an embodiment of a new R-CQICH structure 530 that can provide CQI feedback for multiple CDMA channels. In this embodiment, a 4-bit CQI value for one CDMA channel is encoded with a (12, 4) block code by a block encoder 532 to generate a codeword with 12 symbols. N 1-bit CQI values for N CDMA channels are jointly encoded with a (12, N) block code by a block encoder 534 to generate a codeword with 12 symbols. The rate (R) of a block code is equal to the number of input bits over the number of output bits, or R=4/12 for the (12, 4) block code and R=N/12 for the (12, N) block code. Different code rates generate different amounts of redundancy and require different received signal qualities for reliable reception. Hence, different amounts of transmit power may be used for the codeword from block encoder 534 depending on the number of CDMA channels N.

A switch 536 selects either the output of block encoder 532 for the full mode or the output of block encoder 534 for the differential mode. The symbols from switch 536 are processed by a Walsh cover unit 538, an adder 540, a signal point mapping unit 542, and a Walsh cover unit 544 in the same manner described above for units 518, 520, 522 and 524, respectively, in FIG. 5A. Walsh cover unit 544 provides output symbols, which are further processed and transmitted on the R-CQICH.

The block coding by encoder 534 may be expressed in matrix form as follows:

$$y = u \cdot G, \qquad \text{Eq(1)}$$

where
 $u=[u_0\, u_1 \ldots u_{k-1}]$ is a 1×k row vector for a sequence of 1-bit CQI values, with $u_0$ being the first input bit in vector u,
 $y=[y_0\, y_1 \ldots y_{n-1}]$ is a 1×n row vector for an encoder output codeword, with $y_0$ being the first output bit in vector y, and
 G is a k×n generator matrix for the block coding.

The block codes are typically specified in terms of their generator matrices. Different block codes may be defined for different values of N from 2 through 7 to support up to 7 CDMA channels. The block code for each value of N may be selected to achieve good performance, which may be quantified by the minimum distance between codewords. Table 2 lists exemplary block codes for N=2 through 7. The block codes in Table 2 have the largest possible minimum distance between codewords for linear block codes.

TABLE 2

| Block Code | Generator Matrix |
|---|---|
| (12, 2) | $\underline{G} = \begin{bmatrix} 110 \\ 011 \end{bmatrix}$ |
| (12, 3) | $\underline{G} = \begin{bmatrix} 100110111100 \\ 010011011110 \\ 001001101111 \end{bmatrix}$ |
| (12, 4) | $\underline{G} = \begin{bmatrix} 000011111111 \\ 111100001111 \\ 001100110011 \\ 010101010101 \end{bmatrix}$ |

TABLE 2-continued

| Block Code | Generator Matrix |
|---|---|
| (12, 5) | $\underline{G} = \begin{bmatrix} 101001110000 \\ 010100111000 \\ 001010011100 \\ 000101001110 \\ 000010100111 \end{bmatrix}$ |
| (12, 6) | $\underline{G} = \begin{bmatrix} 101110100000 \\ 010111010000 \\ 001011101000 \\ 000101110100 \\ 000010111010 \\ 000001011101 \end{bmatrix}$ |
| (12, 7) | $\underline{G} = \begin{bmatrix} 100111000000 \\ 010011100000 \\ 001001110000 \\ 000100111000 \\ 000010011100 \\ 000001001110 \\ 000000100111 \end{bmatrix}$ |

The block coding for N=1 may correspond to the 12× bit repetition performed by unit 514 in FIG. 5A. In the embodiment shown in Table 2, a (12, 2) block code is composed of a (3, 2) block code followed by 4× sequence repetition. The generator matrix for the (12, 4) block code in encoder 534 is the same as the generator matrix for the (12, 4) block code in encoders 512 and 532. The (12, 2), (12, 3), (12, 4), (12, 5), (12, 6) and (12, 7) block codes in Table 2 have minimum distances of 8, 6, 6, 4, 4 and 4, respectively. Other generator matrices may also be defined and used for the block codes for the differential CQI reports.

FIG. 5B shows an exemplary R-CQICH structure 530 that supports CQI feedback for multiple CDMA channels and is backward compatible with the current R-CQICH structure 510 shown in FIG. 5A. If only one CDMA channel is being received, then the full CQI reports for this CDMA channel may be processed with the (12, 4) block code, the differential CQI reports may be processed with 12× bit repetition, and the output of Walsh cover unit 544 would be identical to the output of Walsh cover unit 524 in FIG. 5A. Additional CDMA channels may be supported by (1) sending the full CQI reports for the CDMA channels in different slots and (2) sending the differential CQI reports for the CDMA channels jointly in the same slot.

The R-CQICH structure shown in FIG. 5B allows for recovery of the full and differential CQI reports for multiple CDMA channels with little changes to the R-CQICH structure shown in FIG. 5A. The hardware for the physical layer may perform block decoding for the full CQI reports. The demultiplexing of the full CQI reports for different CDMA channels may be performed at a Medium Access Control (MAC) layer. The block decoding for the differential CQI reports may be performed at the physical or MAC layer.

The R-CQICH for multiple CDMA channels may also be implemented with other structures, and this is within the scope of the present invention. For example, the full CQI reports for multiple CDMA channels may be block encoded and sent in the same slot. As another example, differential CQI reports for a subset of the CDMA channels may be sent in a slot.

A terminal may be assigned multiple groups of FL and RL carriers, as shown in FIG. 3. For each carrier group, the R-CQICH sent on the RL carrier in the group may carry CQI reports for the FL carriers in the group, as described above for FIG. 5B. The CQI reports may be sent in various manners.

FIGS. 6A through 6E show some exemplary transmissions on the R-CQICH. In these figures, a full CQI report is represented by a taller box, and a differential CQI report is represented by a shorter box. The height of a box roughly indicates the amount of transmit power used to send the CQI report. The number(s) inside each box indicate the FL carrier(s) being reported by the CQI report sent in that box.

Figure 6A:
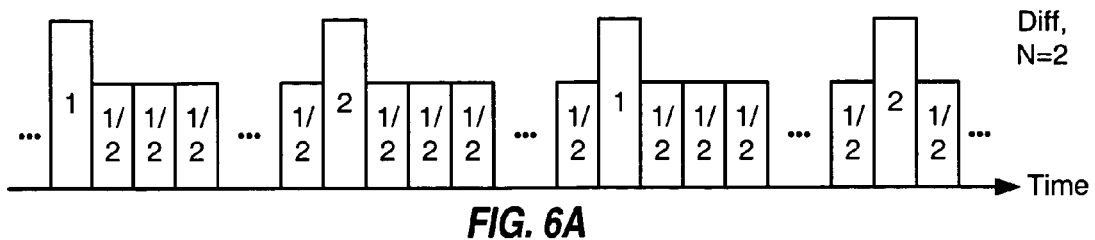
FIGS. 6A through 6E show exemplary transmissions on the new R-CQICH.

FIG. 6A shows transmission of full and differential CQI reports for two FL carriers 1 and 2 on the R-CQICH. In this example, a full CQI report for FL carrier 1 is sent in a slot, then differential CQI reports for FL carriers 1 and 2 are sent in some number slots, then a full CQI report for FL carrier 2 is sent in a slot, then differential CQI reports for FL carriers 1 and 2 are sent in some number slots, then a full CQI report for FL carrier 1 is sent in a slot, and so on. In general, the full CQI reports for each FL carrier may be sent at any rate, and the same or different reporting rates may be used for the FL carriers. In an embodiment, a full CQI report is sent in one (e.g., the first) slot of each 20 ms frame and differential CQI reports are sent in the 15 remaining slots in the frame. The full CQI reports for FL carriers 1 and 2 may alternate as shown in FIG. 6A or may be multiplexed in other manners.

Figure 6B:
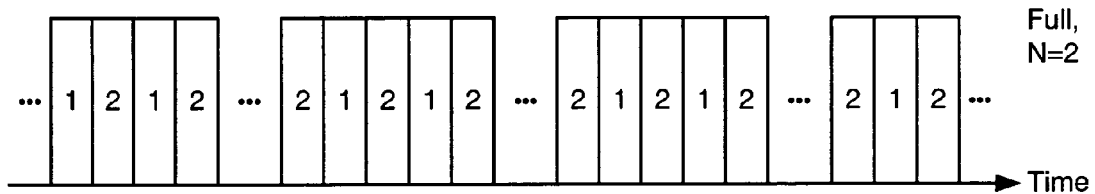

FIG. 6B shows transmission of full CQI reports for two FL carriers 1 and 2 on the R-CQICH. In this example, a full CQI report for FL carrier 1 is sent in a slot, then a full CQI report for FL carrier 2 is sent in the next slot, then a full CQI report for FL carrier 1 is sent in the following slot, and so on.

Figure 6C:
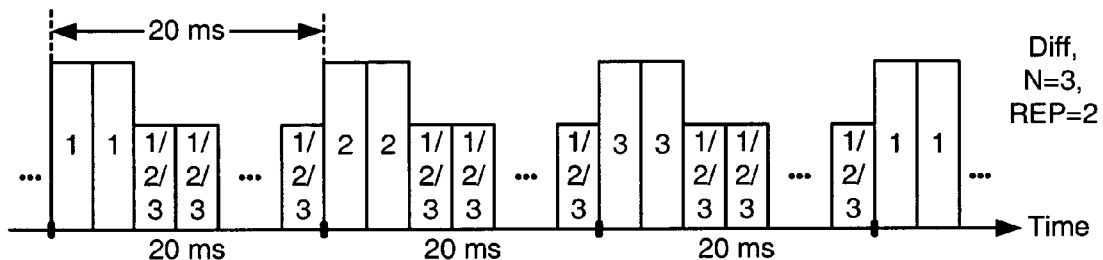

FIG. 6C shows transmission of full and differential CQI reports for three FL carriers 1, 2 and 3 on the R-CQICH with a repetition factor of two, or REP=2. In this example, a full CQI report for FL carrier 1 is sent in the first two slots of a 20 ms frame, then differential CQI reports for FL carriers 1, 2 and 3 are sent in each remaining slot in the frame, then a full CQI report for FL carrier 2 is sent in the first two slots of the next 20 ms frame, then differential CQI reports for FL carriers 1, 2 and 3 are sent in each remaining slot in the frame, then a full CQI report for FL carrier 3 is sent in the first two slots of the following 20 ms frame, then differential CQI reports for FL carriers 1, 2 and 3 are sent in each remaining slot in the frame, then a full CQI report for FL carrier 1 is sent in the first two slots of the next 20 ms frame, and so on. A differential CQI report may be sent in two consecutive slots, similar to the full CQI report, or may be sent in a single slot.

Figure 6D:
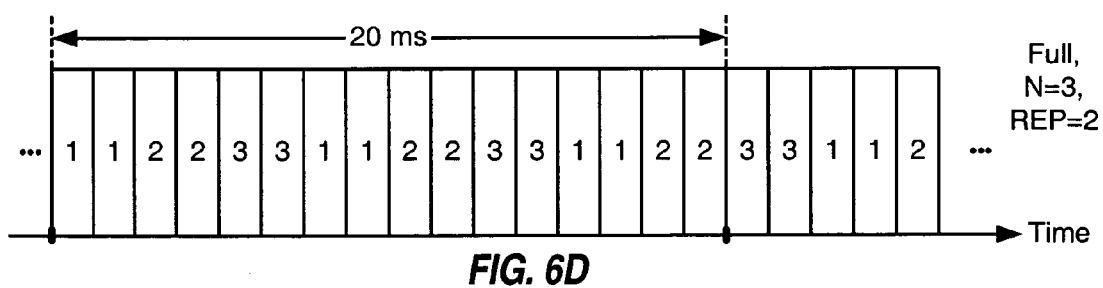

FIG. 6D shows transmission of full CQI reports for three FL carriers 1, 2 and 3 on the R-CQICH with a repetition factor of two. In this example, a full CQI report for FL carrier 1 is sent in two slots, then a full CQI report for FL carrier 2 is sent in the next two slots, then a full CQI report for FL carrier 3 is sent in the following two slots, then a full CQI report for FL carrier 1 is sent in the next two slots, and so on.

Figure 6E:
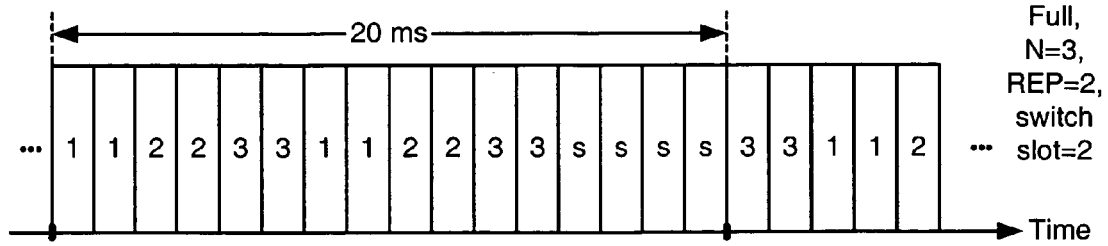

FIG. 6E shows transmission of full CQI reports for three FL carriers 1, 2 and 3 on the R-CQICH with a repetition factor of two and two switch slots. In this example, the full CQI reports for FL carriers 1, 2 and 3 are sent in the manner described above for FIG. 6D. However, the last four slots in the 20 ms frame are used to send a switch slot pattern (denoted as "s" in FIG. 6E), which is a message to switch to a new serving base station.

As shown in FIGS. 6A through 6E, the time division multiplexing of the full CQI reports for all FL carriers results in the reporting rate for the full CQI reports for a given FL carrier decreasing as the number of FL carriers in a group increases. For example, if a group includes 7 FL carriers, then a full CQI report may be sent at a rate of once every 7×20 ms=140 ms for each FL carrier. The joint encoding of the differential CQI reports for all FL carriers results in the reporting rate for the differential CQI reports being independent of, and unaffected by, the number of FL carriers in the group. When switching to a new cell, the switch slot pattern "punctures" (or replaces) the full CQI reports. This puncturing may not equally impact all FL carriers. In the example shown in FIG. 6E, the switch slot pattern impacts FL carriers 1 and 2 but not FL carrier 3.

In an embodiment, a terminal selects a single base station for data transmission on the forward link. This single base station may be selected based on received signal qualities measured at the terminal for the primary FL carrier, all assigned FL carriers, or a subset of the assigned FL carriers. The R-CQICHs for all RL carriers use the Walsh cover for the selected base station and hence point to the same cell. The selection of a single base station avoids out-of-order transmissions on the forward link and its potential negative impact on Radio Link Protocol (RLP). In the forward direction, RLP frames are typically pre-packed at a Base Station Controller (BSC) and then forwarded to a base station for transmission to the terminal. Hence, out-of-order transmission of RLP frames may be avoided by transmitting from a single base station.

In another embodiment, a terminal may select multiple base stations for data transmission on the forward link. Since fading characteristics may be different for different FL carriers, as noted above, this embodiment allows the terminal to select a suitable base station for each FL carrier or each group of FL carriers, which may improve the overall throughput.

3. R-PICH

It is desirable to reduce reverse link overhead for data transmission on the forward link. This may be achieved by assigning a terminal with a single carrier group composed of multiple FL carriers and a single RL carrier. Data may be sent on the multiple FL carriers, and acknowledgements and CQI feedback may be efficiently sent on the single RL carrier.

In certain instances, multiple RL carriers may be utilized. For example, a base station may not support the new R-ACKCH and R-CQICH structures described above. In this case, each FL carrier may be associated with one RL carrier that supports the R-ACKCH and R-CQICH for that FL carrier.

In cdma2000 revision D, a terminal transmits a pilot on the R-PICH to assist a base station in detecting a reverse link transmission. If a single RL carrier is assigned, then the pilot overhead is shared among all FL carriers associated with this RL carrier. However, if multiple RL carriers are assigned and if the R-PICH is sent on each RL carrier to support the R-ACKCH and R-CQICH, then the pilot overhead may be significant for such low data rate on the reverse link. A reduction in pilot overhead may be achieved by using a control-hold mode.

Figure 7:
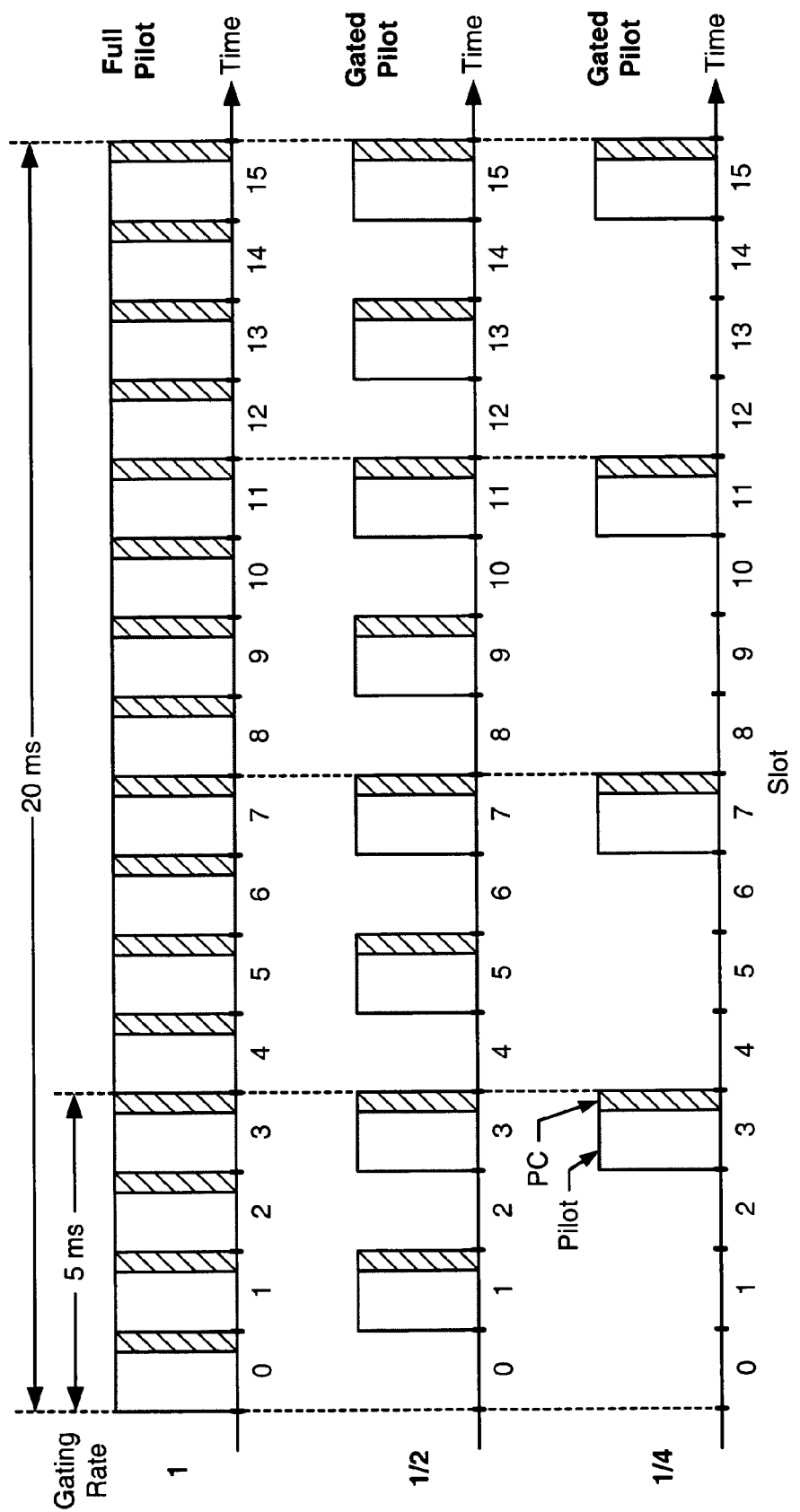
FIG. 7 shows transmission of full and gated pilots on an R-PICH.

FIG. 7 shows transmission of full and gated pilots on the R-PICH. A full pilot is a pilot transmission in each slot and is referred to as pilot gating rate 1. The control-hold mode defined in cdma2000 revision D (or simply, the "Rev D control-hold mode") supports pilot gating rates of ½ and ¼. As shown in FIG. 7, a gated pilot is a pilot transmission in some of the slots, or more specifically in every other slot for pilot gating rate of ½ and every fourth slot for pilot gating rate of ¼.

In cdma2000 revision D, a base station places a terminal in the control-hold mode by sending a Layer 3 message, typically after expiration of a control-hold timer. For example, if the base station does not receive any data from and does not send any data to the terminal for a particular time period, then the base station may send a Layer 3 message to the terminal to place it in the control-hold mode. The arrival of new data at either the base station or the terminal triggers a transition out of the control-hold mode. If the new data arrives at the terminal, then the terminal autonomously transitions out of the control-hold mode and starts transmitting full pilot along with data on the reverse link. The base station detects the transition out of the control-hold mode by the terminal and decodes the data sent with the full pilot. If the new data arrives at the base station, then the base station first wakes up the terminal by sending a MAC message on the F-PDCCH. While in the control-hold mode, the terminal does not process the F-PDCH in order to conserve power.

Many applications are characterized by asymmetric data traffic, and multiple F-PDCHs on multiple FL carriers may be desirable for these applications. As a consequence, multiple reverse pilots may need to be sent on multiple RL carriers to support the multiple F-PDCHs. Besides the reverse pilots, the traffic on the auxiliary RL carriers may consist of only CQI reports on the R-CQICH and acknowledgements on the R-ACKCH. In such a scenario, the use of the control-hold mode may significantly reduce reverse link overhead on the auxiliary RL carriers.

However, the Rev D control-hold mode is not directly applicable for the auxiliary RL carriers for the following reasons. First, the terminal does not decode the F-PDCH while in the Rev D control-hold mode. Second, the terminal is required to transition out of the Rev D control-hold mode before transmitting on the R-ACKCH, and a Layer 3 message from the base station is needed to put the terminal back in the control-hold mode. It is undesirable to have to send the Layer 3 message each time the terminal transmits on the R-ACKCH. Furthermore, since the base station sends the Layer 3 message after the control-hold timer expires (which is typically on the order of few hundred milliseconds), the full pilot is transmitted on the reverse link during this time.

In yet another aspect, an "auxiliary" control-hold mode is defined for use on an auxiliary RL carrier. In an embodiment, the auxiliary control-hold mode differs from the Rev D control-hold mode in the following manners:

- The terminal can process the F-PDCH while in the auxiliary control-hold mode,
- The terminal can transmit acknowledgements on the R-ACKCH without transitioning out of the auxiliary control-hold mode,
- If the F-PDCH is successfully decoded, then the terminal can autonomously transmit full pilot along with the acknowledgements on R-ACKCH, and
- The terminal can resume pilot gating after completing the R-ACKCH transmission.

The auxiliary control-hold mode may also be defined with different and/or additional features.

To reduce pilot overhead on the reverse link, the Rev D control-hold mode may be used on the primary RL carrier, and the auxiliary control-hold mode may be used on each auxiliary RL carrier. The two versions of the control-hold mode can support efficient operation of multiple RL carriers for multi-carrier operation.

In an embodiment, the control-hold mode may be independently defined for each RL carrier. The following scenarios are possible:

- The primary RL carrier is in an active mode and any number of auxiliary RL carriers may be in the control-hold mode. The terminal can process the F-PDCH for the auxiliary RL carriers and can transmit on the R-ACKCH without leaving the control-hold mode.

All RL carriers are in the control hold mode. The terminal does not process the F-PDCH and does not transmit on the R-ACKCH without leaving the control-hold mode. This is a power conserving mode.

4. R-REQCH

A terminal may send various types of information on the R-REQCH to a base station. The triggers for sending R-REQCH messages in cdma2000 revision D may also be used as the triggers for sending R-REQCH messages for multi-carrier operation. In an embodiment, a terminal sends R-REQCH messages on the primary RL carrier to convey service related information to a base station. A single buffer may be maintained per service for data transmission on all RL carriers. The service related information may include buffer size and watermark crossing. In an embodiment, the terminal sends R-REQCH messages on both the primary and auxiliary RL carriers to convey power headroom for these RL carriers. A power report trigger for each RL carrier may be used to send R-REQCH messages to convey the power headroom for that RL carrier.

5. Scheduling

The scheduling of terminals for data transmission on the forward and reverse links may be performed in various manners. The scheduling may be centralized for multiple carriers or distributed for each carrier. In an embodiment, a centralized scheduler schedules terminals for data transmission across multiple carriers. The centralized scheduler may support flexible scheduling algorithms that can exploit CQI information across all carriers in order to improve throughput and/or provide the desired quality of service (QoS). In another embodiment, a distributed scheduler is provided for each carrier and schedules terminals on that carrier. The distributed schedulers for different carriers may operate independently of one another and may reuse existing scheduling algorithms for cdma2000 revision D.

A terminal may be assigned multiple carriers that may be supported by a single channel card or multiple channel cards at a base station. If multiple FL carriers are handled by different channel cards, then there is a channel card communication delay, which may be on the order of several milliseconds. Even though this delay is small, it is typically larger than 1.25 ms, which is the time to decode the R-ACKCH, and preferably to also decode the R-CQICH, and to schedule a new transmission on the F-PDCH.

The centralized scheduler may incur additional scheduling delay if multiple channel cards are used for different FL carriers. This additional delay is composed of two components. The first component is R-CQICH delay to propagate the CQI feedback from the channel card that is handling the reverse link decoding to the centralized scheduler. The second component is the delay for the selected encoder packet to reach the channel card that is handling the F-PDCH transmission. The additional delay may impact system throughput, but its effect should be limited to a relatively narrow range of velocities and channel models.

The distributed schedulers may not incur the additional delay described above for the centralized scheduler, e.g., if the reverse link decoding and the forward link transmission are handled by a single channel card. This is feasible if there are no auxiliary FL carriers in a carrier group. However, if a distributed scheduler is implemented on each channel card, then a separate buffer may be maintained for each channel card so that the data can be co-located with the scheduler. This card buffer may be small, and a larger buffer may be located elsewhere at the base station. The distributed scheduler should have enough data on hand to schedule traffic. The delay to obtain extra data from the larger buffer may be on the order of several milliseconds. The card buffer size should take into account the highest possible over-the-air data rate in order to avoid buffer underflow. Even though the buffers at the channel cards may be relatively small, there is greater possibility for out-of-order RLP frame reception at a terminal. Hence, a longer detection window may be used for RLP frames. Conventional early NAKing techniques are not useful because they do not account for the fact that traffic may be out of order even in the first transmission. The longer delay detection window in RLP may have greater impact on TCP. Multiple RLP instances, e.g., one per F-PDCH, may be used but may create out-of-order arrival of TCP segments.

RLP frames are commonly pre-packed at a BSC and appended with MUX overhead. Each RLP frame, including the MUX overhead, contains 384 bits in cdma2000 and is identified by a 12-bit sequence number. The cdma2000 RLP header allocates 12 bits for the RLP frame sequence numbers, which are used to re-assemble the RLP frames at a terminal. Given such a small RLP frame size, the sequence space may be inadequate at high rates, such as the ones achievable in multi-carrier configurations. To support high data rates with the existing RLP, the RLP frames may be pre-segmented so that the additional 12 bits of sequence space that are used for segmented RLP frames may be reused. Sequence space is not an issue on the reverse link, since RLP frames do not need to be pre-packed.

A call setup procedure for multi-carrier operation may be implemented as follows. A terminal acquires system information from a Forward Sync Channel (F-SYNCH) and obtains overhead messages from a Forward Paging Channel (F-PCH) or a Forward Broadcast Control Channel (F-BCCH) sent on the primary FL carrier. The terminal then originates a call on the primary RL carrier. A base station may assign a traffic channel to the terminal via an Extended Channel Assignment Message (ECAM) sent on the primary FL carrier. The terminal acquires the traffic channel and transitions to a Mobile Station Control on the Traffic Channel state, which is one of the mobile station operating states in cdma2000. In an embodiment, the operating states are defined for only the primary carriers. The base station may thereafter assign multiple FL and RL carriers, e.g., via a Universal Handoff Direction Message (UHDM). When initializing a traffic channel on a new carrier, the base station may start transmitting commands on a Forward Common Power Control Channel (F-CPCCH) after sending the UHDM. The terminal may start transmitting the R-PICH upon receiving the UHDM. The terminal may send a Handoff Completion Message (HCM), which is a cdma2000 Layer 3 protocol message, on the primary RL carrier to the base station to signal acquisition of the F-CPCCH.

6. Flows and System

Figures 8, 9:
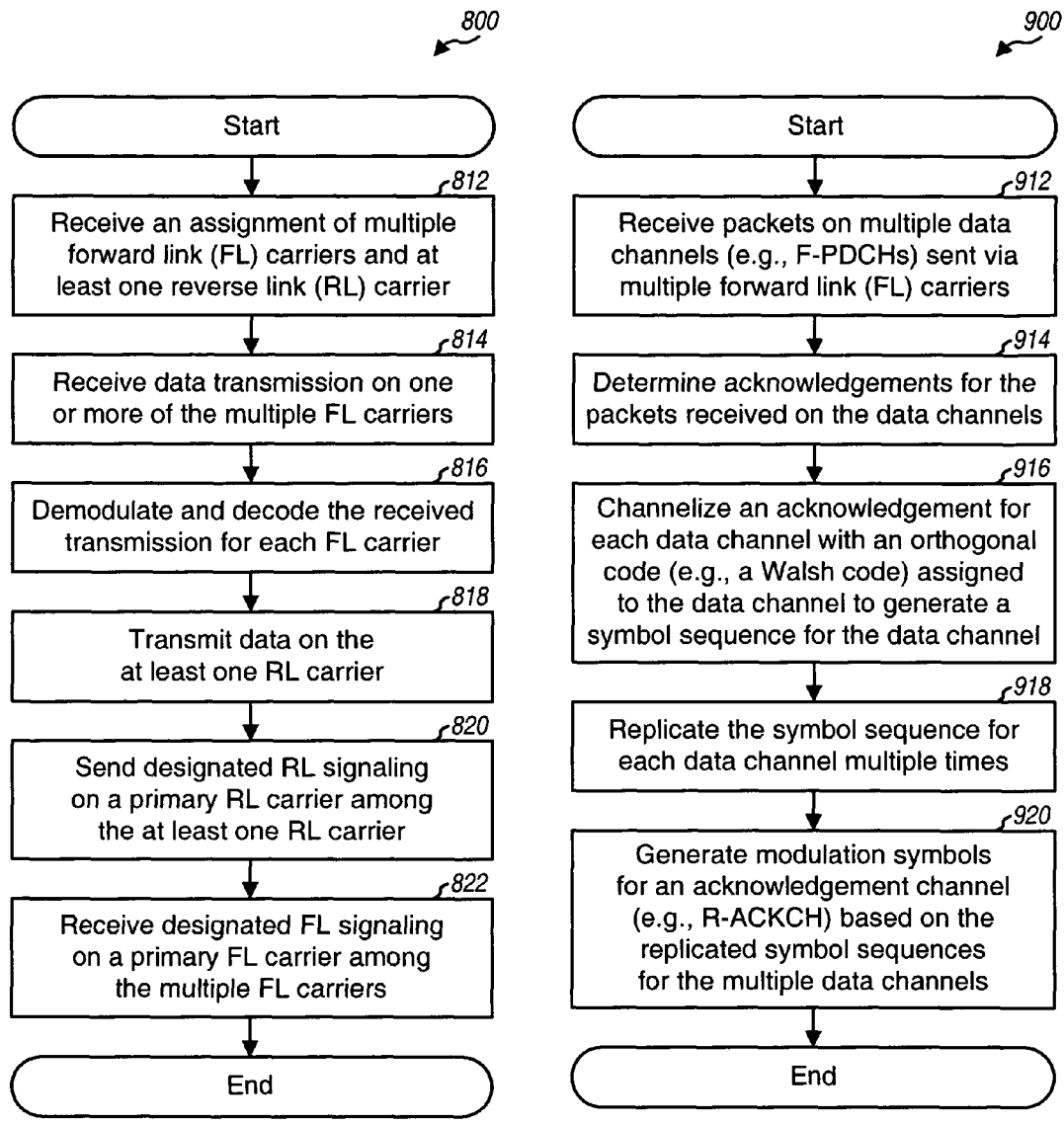
FIG. 8 shows a process performed by a terminal for multi-carrier operation.
FIG. 9 shows a process for sending acknowledgements.

FIG. 8 shows an embodiment of a process 800 performed by a terminal for multi-carrier operation. The terminal receives an assignment of multiple forward link (FL) carriers and at least one reverse link (RL) carrier (block 812). The terminal may receive data transmission on one or more of the multiple FL carriers (block 814). The terminal may demodulate and decode the received data transmission for each FL carrier separately (block 816). The terminal may also transmit data on the at least one RL carrier (block 818). The terminal may be scheduled for data transmission on the forward and/or reverse link based on various factors such as the availability of system resources, the amount of data to send, the channel conditions, and so on.

The terminal may send designated RL signaling on a primary RL carrier, which may be designated from among the at least one RL carrier (block 820). The terminal may receive designated FL signaling on a primary FL carrier, which may be designated from among the multiple FL carriers (block 822). For example, the terminal may originate a call on the primary RL carrier and may receive signaling for call setup on the primary FL carrier. The terminal may select a base station for data transmission on the forward link based on the received signal quality for the primary FL carrier.

The multiple FL carriers and the at least one RL carrier may be arranged in at least one group. Each group may include at least one FL carrier and one RL carrier, as shown in FIG. 3. The terminal may receive packets on the FL carrier(s) in each group and may send acknowledgements for the received packets via the RL carrier in that group. The terminal may also send CQI reports for the FL carrier(s) in each group via the RL carrier in that group. One FL carrier in each group may be designated as a group primary FL carrier. The terminal may receive signaling for the RL carrier in each group via the group primary FL carrier.

FIG. 9 shows an embodiment of a process 900 for sending acknowledgements. A terminal receives packets on multiple data channels (e.g., F-PDCHs) sent via multiple forward link (FL) carriers (block 912). The terminal determines acknowledgements for the packets received on the data channels (block 914). The terminal channelizes the acknowledgement for each data channel with an orthogonal code (e.g., a Walsh code) assigned to that data channel to generate a symbol sequence for the data channel (block 916). The terminal replicates the symbol sequence for each data channel multiple times (block 918). The terminal generates modulation symbols for an acknowledgement channel (e.g., R-ACKCH) based on the replicated symbol sequences for the multiple data channels (block 920).

The number of data channels may be configurable. An orthogonal code of all zeros or all ones may be used if acknowledgements are being sent for only one data channel, e.g., for backward compatibility with cdma2000 revision D. Orthogonal codes of a first length (e.g., four chips) may be used if the number of data channels is less than a first value (e.g., four). Orthogonal codes of a second length (e.g., eight chips) may be used if the number of data channels is equal to or greater than the first value. The repetition factor may also be dependent on the number of data channels.

Figures 10, 11:
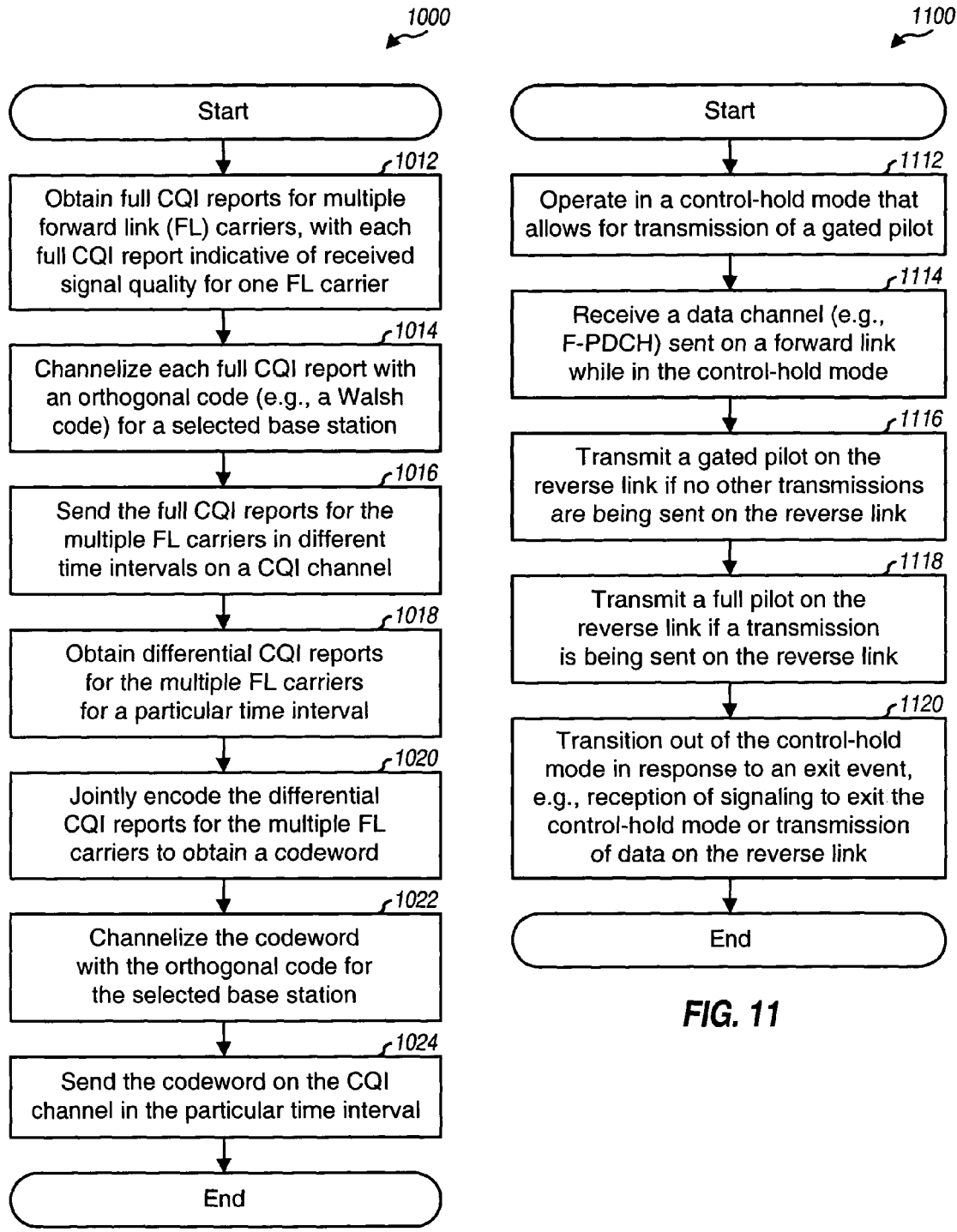
FIG. 10 shows a process for sending CQI reports.
FIG. 11 shows a process for reducing pilot overhead for multi-carrier operation.

FIG. 10 shows an embodiment of a process 1000 for sending channel quality indication (CQI) reports. A terminal obtains full CQI reports for multiple forward link (FL) carriers, with each full CQI report indicative of then received signal quality for one FL carrier (block 1012). The terminal channelizes each full CQI report with an orthogonal code (e.g., a Walsh code) for a selected base station (block 1014). The terminal sends the full CQI reports for the multiple FL carriers in different time intervals (or slots) on a CQI channel (block 1016). The terminal may cycle through the multiple FL carriers, select one FL carrier at a time, and send a full CQI report for each selected FL carrier in a time interval designated for sending full CQI report.

The terminal obtains differential CQI reports for the multiple FL carriers for a particular time interval (block 1018). The terminal jointly encodes the differential CQI reports for the multiple FL carriers to obtain a codeword (block 1020). The terminal may select a block code based on the number of FL carriers and may jointly encode the differential CQI reports with the selected block code. The terminal channelizes the codeword with the orthogonal code for the selected base station (block 1022). The terminal then sends the codeword on the CQI channel in the particular time interval (block 1024).

FIG. 11 shows an embodiment of a process 1100 for reducing pilot overhead, e.g., for multi-carrier operation. A terminal operates in a control-hold mode that allows for transmission of a gated pilot (block 1112). The terminal receives a data channel (e.g., F-PDCH) sent on the forward link while in the control-hold mode (block 1114). The terminal transmits a gated pilot on the reverse link if no other transmissions are being sent on the reverse link (block 1116). The terminal transmits a full pilot on the reverse link if a transmission is being sent on the reverse link (block 1118). For example, the terminal may generate acknowledgements for packets received on the data channel, send the acknowledgements along with the full pilot on the reverse link, and resume transmitting the gated pilot after completing the transmission of the acknowledgements on the reverse link. The terminal transitions out of the control-hold mode in response to an exit event, which may be reception of signaling to exit the control-hold mode, transmission of data on the reverse link, and so on (block 1120).

FIGS. 8 through 11 show processes performed by a terminal for multi-carrier operation. A base station performs the complementary processing to support multi-carrier operation.

Figure 12:
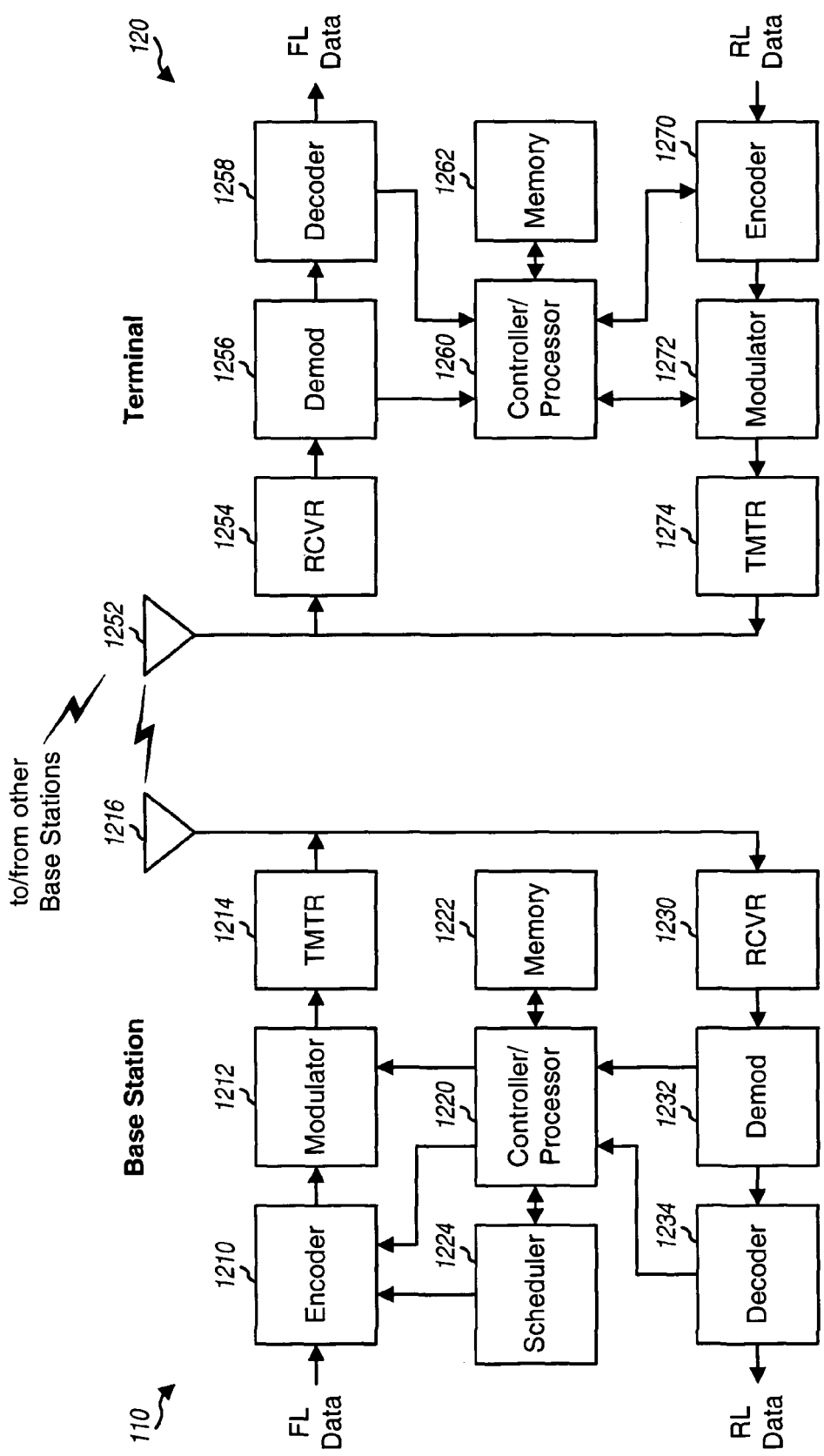
FIG. 12 shows a block diagram of a base station and a terminal.

FIG. 12 shows a block diagram of an embodiment of a base station 110 and a terminal 120. For the forward link, at base station 110, an encoder 1210 receives traffic data and signaling for terminals. Encoder 1210 processes (e.g., encodes, interleaves, and symbol maps) the traffic data and signaling and generates output data for various forward link channels, e.g., the F-PDCH, F-PDCCH, F-ACKCH and F-GCH. A modulator 1212 processes (e.g., channelizes, spectrally spreads, and scrambles) the output data for the various forward link channels and generates output chips. A transmitter (TMTR) 1214 conditions (e.g., converts to analog, amplifies, filters, and frequency upconverts) the output chips and generates a forward link signal, which is transmitted via an antenna 1216.

At terminal 120, an antenna 1252 receives the forward link signal from base station 110 as well as signals from other base stations and provides a received signal to a receiver (RCVR) 1254. Receiver 1254 conditions (e.g., filters, amplifies, frequency downconverts, and digitizes) the received signal and provides data samples. A demodulator (Demod) 1256 processes (e.g., descrambles, despreads, and dechannelizes) the data samples and provides symbol estimates. In an embodiment, receiver 1254 and/or demodulator 1256 perform filtering to pass all FL carriers of interest. A decoder 1258 processes (e.g., demaps, deinterleaves, and decodes) the symbol estimates and provides decoded data for the traffic data and signaling sent by base station 110 to terminal 120. Demodulator 1256 and decoder 1258 may perform demodulation and decoding separately for each FL carrier.

On the reverse link, at terminal 120, an encoder 1270 processes traffic data and signaling (e.g., acknowledgements and CQI reports) and generates output data for various reverse link channels, e.g., the R-PDCH, R-ACKCH, R-CQICH, R-PICH and R-REQCH. A modulator 1272 further processes the output data and generates output chips. A transmitter 1274 conditions the output chips and generates a reverse link signal, which is transmitted via antenna 1252. At base station 110, the reverse link signal is received by antenna 1216, conditioned by a receiver 1230, processed by a demodulator 1232, and further processed by a decoder 1234 to recover the data and signaling sent by terminal 120.

Controllers/processors 1220 and 1260 direct the operation at base station 110 and terminal 120, respectively. Memories 1222 and 1262 store data and program codes for controllers/ processors 1220 and 1260, respectively. A scheduler 1224 may assign FL and/or RL carriers to terminals and may schedule the terminals for data transmission on the forward and reverse links.

The multi-carrier transmission techniques described herein have the following desirable characteristics:

- Multi-carrier forward link that is backward compatible with Rev D forward link—no changes to the Rev D physical layer,
- Multi-carrier reverse link that is backward compatible with Rev D reverse link—new backward compatible R-ACKCH and R-CQICH structures that should not impact hardware implementation, and
- Flexible configurable system—K FL carriers and M RL carriers, where $K \leq N \times M$ and $K \geq M$.

The transmission techniques described herein may provide various advantages. First, the techniques allow cdma2000 revision D to support multiple carriers using only or mostly software/firmware upgrade. Relatively minor changes are made to some RL channels (e.g., the R-ACKCH and R-CQICH) to support multi-carrier operation. These changes may be handled by software/firmware upgrade at the base stations so that existing hardware such as channel cards may be reused. Second, higher peak data rates may be supported on the forward and reverse links. Third, the use of multiple F-PDCHs on multiple FL carriers may improve diversity, which may improve QoS. The flexible carrier structure allows gradual increase in data rates with advances in VLSI technology.

Headings are included herein for reference and to aid in locating certain sections. These headings are not intended to limit the scope of the concepts described therein under, and these concepts may have applicability in other sections throughout the entire specification.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus for improving capacity for high data rate transmission in a wireless communication system comprising:
   at least one processor configured to receive an assignment of multiple downlink carriers from a base station comprising one or more packet data channels (PDCH) and at least one uplink carrier, and thereafter to receive data transmission on one or more of the multiple downlink carriers, wherein the assignment of the multiple downlink carriers is based on one of a transmission channel, a desired data transmission rate, and available transmission resources; and
   the at least one processor further configured to send acknowledgement/non-acknowledgement information over one uplink carrier related to the multiple downlink carriers, and to report the quality of the one or more packet data channels over the at least one uplink carrier; and
   a memory coupled to the at least one processor.

2. The apparatus of claim 1, wherein at least one processor is configured to send the acknowledgement/non-acknowledgement information over a dedicated acknowledgement channel using the at least one uplink carrier.

3. The apparatus of claim 1, wherein the at least one processor is configured to separately demodulate and decode the received data transmission for each downlink carrier.

4. The apparatus of claim 1, wherein the at least one processor is configured to send designated uplink signaling on a primary uplink carrier among the at least one uplink carrier, and to receive designated downlink signaling on a primary downlink carrier among the multiple downlink carriers.

5. The apparatus of claim 4, wherein the at least one processor is configured to originate a call on the primary uplink carrier and to receive signaling for call setup on the primary downlink carrier.

6. The apparatus of claim 4, wherein the at least one processor is configured to select a base station for data transmission on forward link based on received signal quality for the primary downlink carrier.

7. The apparatus of claim 1, wherein the multiple downlink carriers and the at least one uplink carrier are arranged in at least one group, each group including at least one downlink carrier and one uplink carrier.

8. The apparatus of claim 7, wherein the at least one processor is configured to receive packets on the at least one downlink carrier in each group and to send acknowledgement/non-acknowledgment information for received packets in each group via the uplink carrier in the group.

9. The apparatus of claim 7, wherein the at least one processor is configured to report the quality of at least one downlink carrier in each group via the uplink carrier in the group.

10. The apparatus of claim 7, wherein one downlink carrier in each group is designated as a group primary downlink carrier, and wherein the at least one processor is configured to receive signaling for the uplink carrier in each group via the group primary downlink carrier.

11. A method for improving capacity for high rate data transmission in a wireless communication system comprising:
receiving an assignment of multiple downlink carriers from a base station comprising one or more packet data channels (PDCH) and at least one uplink carrier wherein the assignment of the multiple downlink carriers is based on one of a transmission channel, a desired data transmission rate, and available transmission resources;
receiving data transmission on one or more of the multiple downlink carriers from the base station;
sending acknowledgement/non-acknowledgement information to the base station over one uplink carrier related to the multiple downlink carriers; and
reporting the quality of the one or more packet data channels to the base station over the at least one uplink carrier.

12. The method of claim 11, wherein the acknowledgement/non-acknowledgement information is sent over a dedicated acknowledgement channel using the at least one uplink carrier.

13. The method of claim 11, wherein the multiple downlink carriers and the at least one uplink carrier are arranged in at least one group, each group including at least one downlink carrier and one uplink carrier.

14. An apparatus for improving the capacity for high data rate transmission in a wireless communication system with a structure for higher data rates comprising:
means for receiving an assignment of multiple downlink carriers from a base station comprising one or more packet data channels (PDCH) and at least one uplink carrier wherein the assignment of the multiple downlink carriers is based on one of a transmission channel, a desired data transmission rate, and available transmission resources;
means for receiving data transmission on one or more of the multiple downlink carriers from the base station;
means for sending acknowledgement/non-acknowledgement information to the base station over one uplink carrier related to the multiple downlink carriers; and
means for reporting the quality of the one or more packet data channels to the base station over the at least one uplink carrier.

15. The apparatus of claim 14, wherein the means for sending acknowledgement/non-acknowledgement information is configured to send the information over a dedicated acknowledgement channel using the at least one uplink carrier.

16. The apparatus of claim 14, wherein the multiple downlink carriers and the at least one uplink carrier are arranged in at least one group, each group including at least one downlink carrier and one uplink carrier.

17. The apparatus of claim 16, further comprising:
means for reporting the quality of the one or more packet data channels to the base station over the at least one uplink carrier is further configured to report for the at least one downlink carrier in each group via the uplink carrier in the group.

18. A non-transitory computer readable medium configured for improving the capacity for high data rate transmission in a wireless communication system with a structure for higher data rates, the medium storing instructions operable to:
receive an assignment of multiple downlink carriers from a base station comprising one or more packet data channels (PDCH) and at least one uplink carrier wherein the assignment of the multiple downlink carriers is based on one of a transmission channel, a desired data transmission rate, and available transmission resources;
receive data transmission on one or more of the multiple downlink carriers from the base station;
send acknowledgement/non-acknowledgement information to the base station over one uplink carrier related to the multiple downlink carriers; and
report the quality of the one or more packet data channels to the base station over the at least one uplink carrier.

19. The non-transitory computer readable medium of claim 18, wherein the medium further stores instructions operable for sending the acknowledgement/non-acknowledgement information over a dedicated acknowledgement channel using the at least one uplink carrier.

20. The non-transitory computer readable medium of claim 18, wherein the medium further stores instructions operable for arranging the multiple downlink carriers and the at least one uplink carrier in at least one group, each group including at least one downlink carrier and one uplink carrier.

21. The non-transitory computer readable medium of claim 20, wherein the instructions operable for reporting the quality of the one or more packet data channels to the base station over the at least one uplink carrier are further configured to report for the at least one downlink carrier in each group via the uplink carrier in the group.

* * * * *